(12) United States Patent
Choi et al.

(10) Patent No.: US 10,970,704 B2
(45) Date of Patent: Apr. 6, 2021

(54) MOBILE TERMINAL AND METHOD FOR OPERATING SAME

(71) Applicant: LG ELECTRONICS INC., Seoul (KR)

(72) Inventors: Jeonghyun Choi, Seoul (KR); Hyunjoo Jeon, Seoul (KR); Sunjung Lee, Seoul (KR); Yoonshinn Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 86 days.

(21) Appl. No.: 16/085,299

(22) PCT Filed: Mar. 29, 2016

(86) PCT No.: PCT/KR2016/003223
§ 371 (c)(1),
(2) Date: Sep. 14, 2018

(87) PCT Pub. No.: WO2017/159913
PCT Pub. Date: Sep. 21, 2017

(65) Prior Publication Data
US 2019/0102768 A1 Apr. 4, 2019

(30) Foreign Application Priority Data

Mar. 16, 2016 (KR) .................. 10-2016-0031710

(51) Int. Cl.
*G06Q 20/32* (2012.01)
*H04M 1/02* (2006.01)
(Continued)

(52) U.S. Cl.
CPC ......... *G06Q 20/322* (2013.01); *G06F 3/0486* (2013.01); *G06Q 20/32* (2013.01);
(Continued)

(58) Field of Classification Search
CPC .................................................. G06Q 20/322
See application file for complete search history.

(56) References Cited

U.S. PATENT DOCUMENTS

2009/0285492 A1* 11/2009 Ramanujapuram ... G06F 16/583
382/209
2010/0279667 A1* 11/2010 Wehrs .................... H04L 51/046
455/414.1
(Continued)

FOREIGN PATENT DOCUMENTS

CN 103997564 B * 7/2017 ......... G06F 3/04842
KR 10-2006-0086793 A 8/2006
(Continued)

OTHER PUBLICATIONS

"Google Apps Administrator Help, Sep. 19, 2015, all pages" (Year: 2015).*
(Continued)

*Primary Examiner* — Hani M Kazimi
*Assistant Examiner* — Adam Hilmantel
(74) *Attorney, Agent, or Firm* — Birch, Stewart, Kolasch & Birch, LLP

(57) ABSTRACT

A method for operating a mobile terminal is disclosed. The method for operating a mobile terminal according to an exemplary embodiment of the present invention comprises the steps of: executing a payment application; and displaying, when the payment application is executed, information on histories of one or more payments performed in the mobile terminal on the basis of an image displayed on the mobile terminal.

8 Claims, 30 Drawing Sheets

(51) Int. Cl.
*H04M 1/725* (2021.01)
*G06F 3/0486* (2013.01)
*G06Q 20/38* (2012.01)
*G06Q 30/06* (2012.01)

(52) U.S. Cl.
CPC ....... *G06Q 20/325* (2013.01); *G06Q 20/3274* (2013.01); *G06Q 20/389* (2013.01); *G06Q 30/0623* (2013.01); *H04M 1/02* (2013.01); *H04M 1/725* (2013.01); *H04M 1/72522* (2013.01)

(56) References Cited

U.S. PATENT DOCUMENTS

| | | | | |
|---|---|---|---|---|
| 2012/0284101 A1* | 11/2012 | Schiller | ............... | G06Q 30/06 705/14.23 |
| 2013/0320080 A1* | 12/2013 | Olson | ............... | G07F 7/0833 235/380 |
| 2014/0229888 A1* | 8/2014 | Ko | ............... | G06F 3/04842 715/783 |
| 2015/0220914 A1* | 8/2015 | Purves | ............... | G06Q 20/36 705/26.8 |
| 2015/0221023 A1 | 8/2015 | Numazu et al. | | |
| 2015/0331551 A1* | 11/2015 | Lee | ............... | G06F 3/04817 715/781 |
| 2016/0086255 A1* | 3/2016 | Sainfort | ............... | G06Q 10/087 705/26.41 |

FOREIGN PATENT DOCUMENTS

| | | |
|---|---|---|
| KR | 10-2008-0111430 A | 12/2008 |
| KR | 10-2011-0068116 A | 6/2011 |

OTHER PUBLICATIONS

Rim, "[Shinhan App Card] Make use of Shinhan App Card Mobile—11th", Street Mobile Payment—Shinhan App Card Experience, Aug. 23, 2013, total 7 pages, <http://blog.naver.com/ddbba/20194349443>.

* cited by examiner

MOBILE TERMINAL AND METHOD FOR OPERATING SAME

CROSS-REFERENCE TO RELATED APPLICATIONS

This application is the National Phase of PCT International Application No. PCT/KR2016/003223, filed on Mar. 29, 2016, which claims priority under 35 U.S.C. 119(a) to Patent Application No. 10-2016-0031710, filed in Republic of Korea on Mar. 16, 2016, all of which are hereby expressly incorporated by reference into the present application.

BACKGROUND OF THE INVENTION

Field of the Invention

The present invention relates to a mobile terminal capable of easily displaying the detail of a payment act performed by the mobile terminal and of selectively providing a payment detail which a user wants to determine, and a method for operating the same.

Discussion of the Related Art

As a mobile communication industry is rapidly developed, mobile terminals have become necessities for individuals. Accordingly, a mobile terminal has been changed to a terminal that performs a more complex function through various additional functions, as well as functions of conventional voice communication and data communication.

As a society is developed, various types of credit payment means, such as a credit card, are emerging beyond cash to serve as payment means in various transactions. In addition, there are extensively suggested technologies utilizing a mobile communication terminal as payment means by storing information related to a credit card of a user in the mobile communication terminal, as the mobile communication industry is developed.

Meanwhile, as the mobile communication terminal is extensively used as payment means, it is increasingly necessary for a user to determine a payment detail through the mobile terminal.

In this case, the user may determine the payment detail by searching and executing a separate menu for determining the payment detail, in addition to handling the mobile terminal to make payment.

Accordingly, there is raised a need to make it easier for the user to determine the detail of a payment act performed by using the mobile communication terminal.

In addition, there is raised a need to selectively provide a payment detail, which the user wants to determine, among numerous payment details, in the environment that payment acts are widely performed by the mobile terminal.

SUMMARY OF THE INVENTION

In order to solve the above problem, the present invention is to provide a mobile terminal capable of easily displaying the detail of a payment act performed by the mobile terminal and of selectively providing a payment detail which a user wants to determine, and a method for operating the same.

According to an embodiment of the present invention, a method of operating a mobile terminal may include executing a payment application, and displaying information on details of one or more payment acts performed by the mobile terminal, based on an image displayed on the mobile terminal, when the payment application is executed.

Meanwhile, according to an embodiment of the present invention, a mobile terminal may include a display unit to display an image, and a controller to execute a payment application and to control the display unit to display information on details of one or more payment acts performed by the mobile terminal, based on an image displayed on the display unit, when the payment application is executed.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1:
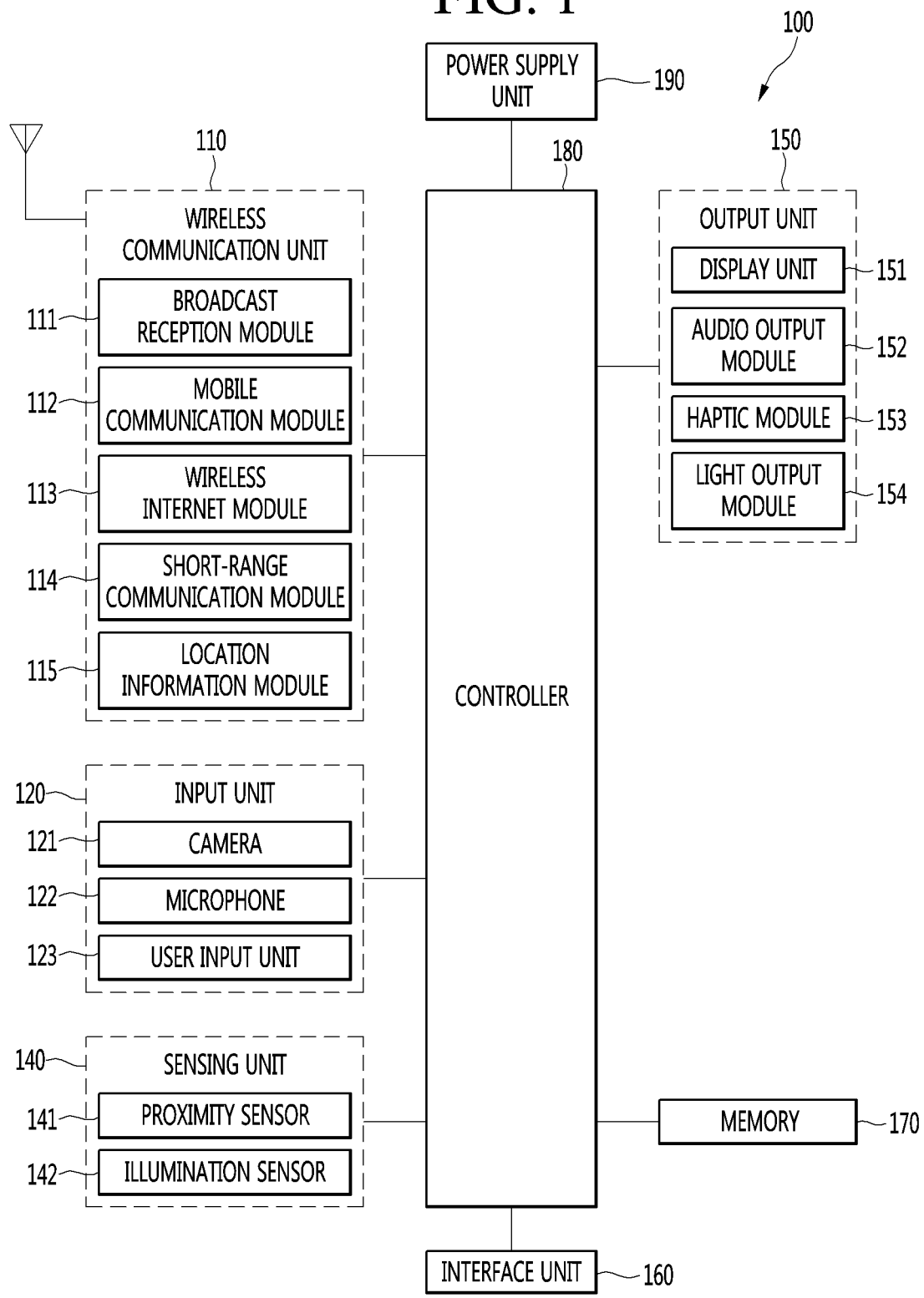
FIG. 1 is a block diagram illustrating a mobile terminal according to the present invention.

Reference is now made to FIG. 1, where FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof. The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1 according to the execution of an application program that have been stored in the memory 170.

Meanwhile, in the present specification, the memory 170 and the storage unit 170 are interchangeable.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the components may operate in cooperation with each other to implement a method of operating, controlling, a mobile terminal or controlling the operation of the mobile terminal according to various embodiments described below. In addition, a method of operating, controlling, or controlling the operation of the mobile terminal may be implemented on the mobile terminal by driving at least one application program stored in the memory 170.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A(Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is used for short-range communication, and may support the short-range communication by using at least one of technologies such as a Bluetooth™, a Radio Frequency Identification (RFID), an Infrared Data Association (IrDA), an Ultra Wideband (UWB), a ZigBee, NFC (Near field communication), Wi-Fi (Wireless-Fidelity), Wi-Fi Direct, Wireless USB (Wireless Universal Serial Bus), and Magnetic Security Transmission (MST).

Here, the MST system is a system that converts internal information of the mobile terminal 100 into a magnetic field and transmits the magnetic field. For example, when the mobile terminal 100 is tagged to a POS terminal, the payment information of the mobile terminal 100 may be converted into a magnetic field to be transmitted to the POS terminal.

The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The short-range communication module 114 may detect (or recognize) another mobile terminal that is capable of communicating with the mobile terminal 100 around the mobile terminal 100. Further, the control unit 180 may transmit at least a part of data processed in the mobile terminal 100 to the short-range communication module 114 when the another mobile terminal is an authorized device to communicate with the mobile terminal 100 according to the present invention. Accordingly, the user of another mobile terminal may use data processed by the mobile terminal 100 through another mobile terminal. For example, according to an embodiment, when a call is received in the mobile terminal 100, the user makes communicate with through another mobile terminal, or when a message is received to the mobile terminal 100, it is possible to confirm the received message.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image. The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof. The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

The sensing unit 140 may include various sensing units such as a gravity sensor, a geomagnetic sensor, a gyro sensor, an acceleration sensor, an inclination sensor, an altitude sensor, a depth sensor, a gyroscope sensor, an angular velocity sensor, and a GPS sensor.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event. For example, the interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or can perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method for acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power(RSRP), reference signal received quality(RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

Meanwhile, the following various embodiments may be realized in a recording medium that may be read by a computer or a device similar to the computer, by using, for example, software, hardware, or the combination thereof.

In addition, the mobile terminal 100 may be a wearable device, and may be a watch-type mobile terminal among wearable devices.

Meanwhile, the input unit 120 may further include the sensing unit 140 to sense a user input to a touch screen, in addition to the camera 121, the microphone 122, and the user input unit 123 described above.

Meanwhile, some of components of the mobile terminal 100 described with reference to FIG. 1 may be omitted or modified.

Meanwhile, although the following description of the present invention will be described regarding the mobile terminal 100 by way of example, the present invention is not limited thereto. The following description of the present invention may be realized in another device in which the embodiment described in the present invention is realized. Even in this case, some of components described with reference to FIG. 1 may be omitted or modified.

Figure 2:
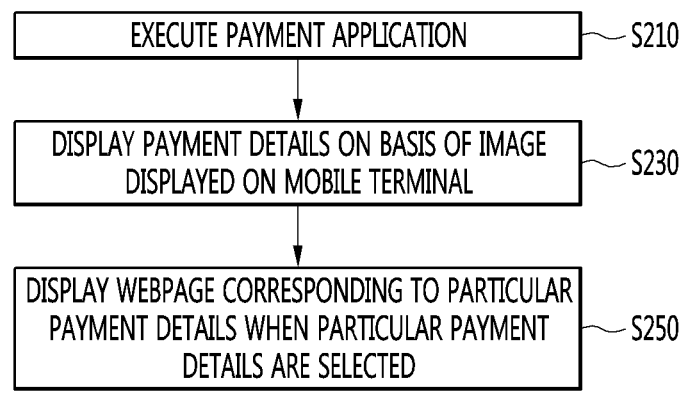
FIG. 2 is a flowchart illustrating a method for operating the mobile terminal, according to an embodiment of the present invention.

FIG. 2 is a flowchart illustrating a method for operating the mobile terminal, according to an embodiment of the present invention.

According to an embodiment of the present invention, the method for operating the mobile terminal 100 may include performing a payment application (S210), displaying the histories of one or more payments performed by the mobile terminal, based on an image displayed on the mobile terminal, if the payment application is performed (S230), and displaying a web-page corresponding to the specific payment detail, if receiving an input for selecting the specific payment detail (S250).

Meanwhile, executing the payment application (S210) will be described in detail with reference to FIGS. 3 to 5.

Figure 3:
FIGS. 3 to 5 are views illustrating a method for executing a payment application according to an embodiment of the present invention.
Figure 4:
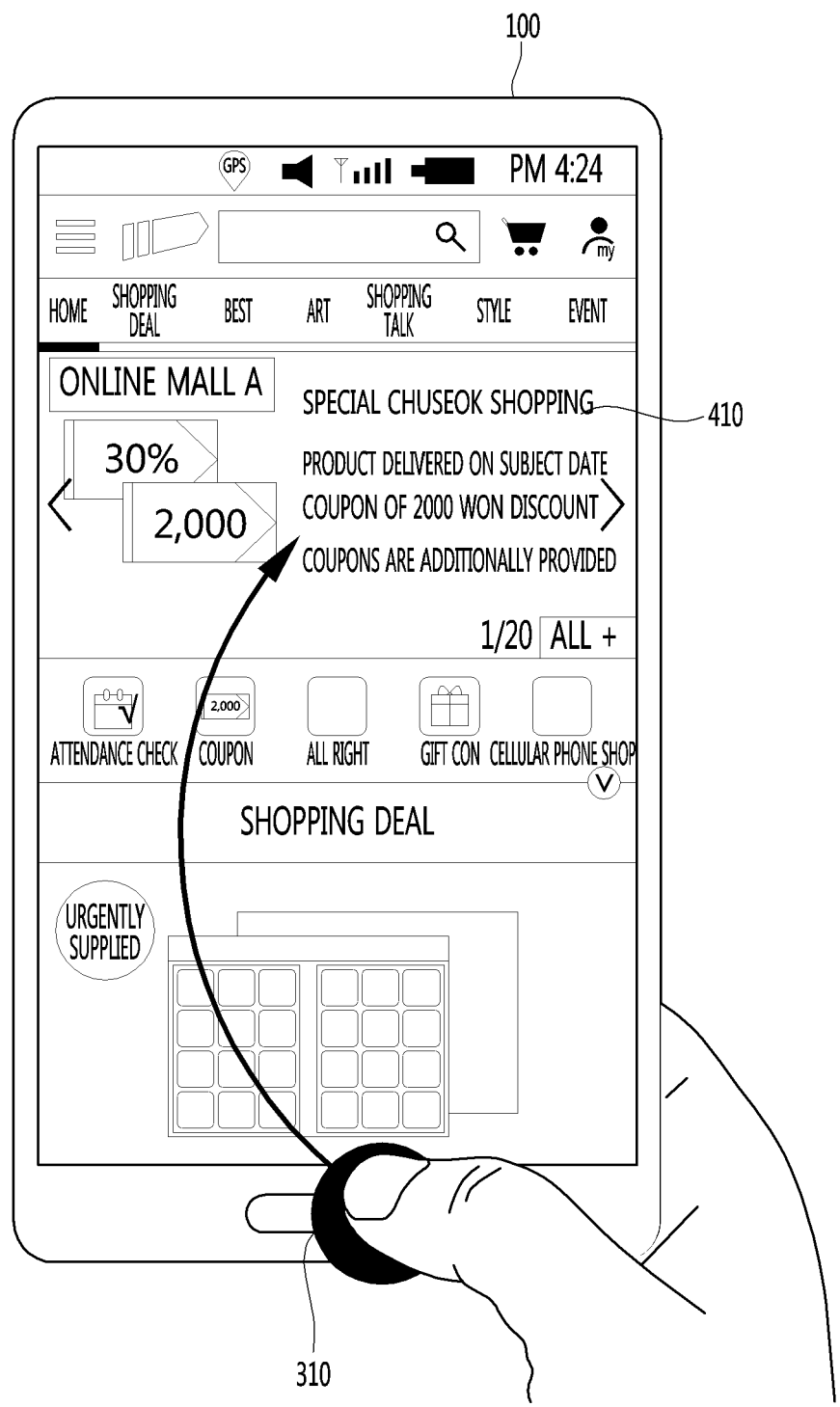
Figure 5:
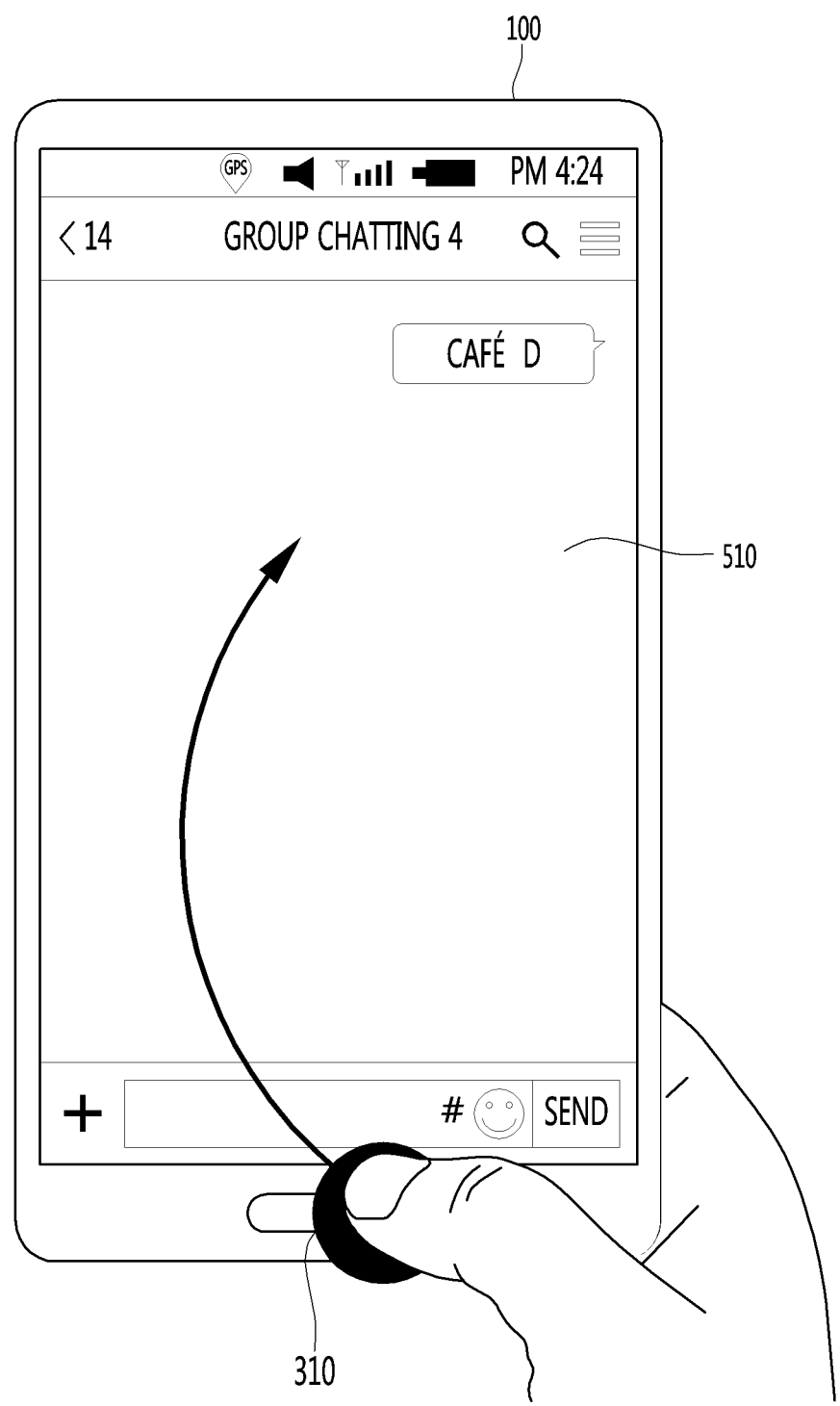

FIGS. 3 to 5 are views illustrating a method for executing the payment application according to an embodiment of the present invention.

If an input for executing the payment application is received, the controller 180 may execute the payment application. In detail, as illustrated in FIG. 3, if receiving an input of touching a fingerprint recognizing unit 310 and then swiping up, the controller 180 may execute the payment application.

The input for executing the payment application is not limited to the input of touching the fingerprint recognizing unit 310 and then swiping up, and all well-known manners may be applied thereto Meanwhile, the description has been made with reference to FIG. 3 regarding the execution of the payment application in the state that a background screen is displayed on the mobile terminal 100, instead of displaying an execution screen of a specific application on the mobile terminal 100.

However, the present invention is not limited thereto. For example, the controller 190 may execute the payment application as the input for executing the payment application is received in the state that the execution screen of the specific application is displayed on the mobile terminal 100.

The details thereof will be described with reference to FIGS. 4 and 5.

Referring to FIG. 4, an execution screen of an Internet application has been executed on the mobile terminal 100. In detail, the controller 180 may link to a specific web-page by executing the Internet application and may control the display unit 151 to display an image 410 of the specific web-page.

Meanwhile, if receiving the input for executing the payment application in the state that the image 410 of the specific web-page is displayed, the controller 180 may execute the payment application.

Meanwhile, the implementation may be made in a manner of executing the payment application, if the input for executing the payment application is received in the state that an image of the web-page related to the payment act performed by the mobile terminal 100 is displayed.

In this case, the web-page related to the payment act performed by the mobile terminal 100 is a web-page for selling the product, and is a web-page on which the product provided for sales on the web-page has been purchased by using the payment application of the mobile terminal 100. In this case, the payment application may include not only the payment application described in the present specification, but also all payment applications that may be used in purchasing a product using the mobile terminal 100.

Regarding the details of a manner of executing the payment application in the state that the image of the web-page related to the payment act performed by the mobile terminal 100 is displayed, the controller 180 may determine if the web-page currently displayed is a web-page on which a product has been purchased by using one or more payment applications of the mobile terminal 100.

In detail, when a product is purchased as the payment act is performed by the mobile terminal 100, the controller 180 may store, in the storage unit 170, an address of the web-page subject to the payment act. Meanwhile, when the input for executing the payment application is received in the state that a web-page is displayed, the controller 180 may determine whether the address of the web-page currently displayed is matched with an address of a web-page stored in the storage unit 170. In this case, the address of the web-page currently displayed does not need to be fully matched with the address of the web-page stored in the storage unit 170. In other words, if the address of the web-page currently displayed is partially matched with the address of the web-page stored in the storage unit 170, the controller 180 may determine the address of the web-page currently displayed as being matched with the address of the web-page stored in the storage unit 170.

Meanwhile, when the web-page currently displayed is a web-page on which a product has been purchased on the mobile terminal 100 and when the input for executing the payment application is received, the controller 180 may execute the payment application.

Meanwhile, when the web-page currently displayed is not a web-page on which a product has been purchased on the mobile terminal 100, even if the input for executing the payment application is received, the controller 180 may not execute the payment application.

Meanwhile, when the web-page currently displayed is the web-page on which the product has been purchased on the mobile terminal 100, the controller 180 may display an icon (not illustrated) for executing the payment application. In this case, when an input of selecting the icon (not illustrated) for executing the payment application is received, the controller 180 may execute the payment application.

One object of the present invention is to provide information on a payment detail. If the payment application is executed even on a web-page irrelevant to a payment act, inconvenience may be caused to a user. Therefore, according to the present invention, the payment detail may be provided for the user by executing the payment application only the web-page related to the payment act performed by the mobile terminal.

In addition, according to the present invention, when the web-page currently displayed is the web-page on which a product has been purchased on the mobile terminal, the icon for executing the payment application is displayed to allow a user to recognize that the user has made a payment on the web-page currently displayed, and to provide an environment that the payment application may be easily executed.

Meanwhile, in the state of displaying an execution screen of a specific application, which is related to the payment act performed on the mobile terminal, among a plurality of applications installed on the mobile terminal 100, if the input for executing the payment application is received, the controller 180 may execute the payment application.

In this case, the application related to the payment act performed by the mobile terminal 100 may be an application that may acquire a keyword for displaying histories of one or more payment performed by the mobile terminal 100.

For example, as illustrated in FIG. 5, in the state of displaying an execution screen 510 of a messenger application among a plurality of applications installed on the mobile terminal 100, as the input for executing the payment application is received, the controller 180 may execute the payment application. Meanwhile, a manner of acquiring the keyword for displaying one or more details of the one or more payment acts performed by the mobile terminal 100 will be described later in detail.

Meanwhile, when an application currently displayed is not the application related to the payment act performed by the mobile terminal 100, even if the input for executing the payment application is received, the controller 180 may not execute the payment application.

Meanwhile, when the application currently displayed is an application for acquiring the keyword for displaying the details of the one or more payment acts performed by the mobile terminal 100, and when the keyword for displaying the details of the one or more payment acts performed by the mobile terminal 100 is acquired through the application currently displayed, the controller 180 may display an icon (not illustrated) for executing the payment application. In this case, when the input of selecting the icon (not illustrated) for executing the payment application is received, the controller 180 may perform the payment application. The detailed manner will be described later.

Referring to FIG. 2, the method for operating the mobile terminal 100 may include displaying the details of the one or more payment acts performed by the mobile terminal, based on an image displayed on the mobile terminal, if the payment application is performed (S230), and displaying a web-page corresponding to a specific payment detail, if receiving an input for selecting the specific payment detail (S250).

The details thereof will be described in detail with reference to FIGS. 6 to 23.

Figure 6:
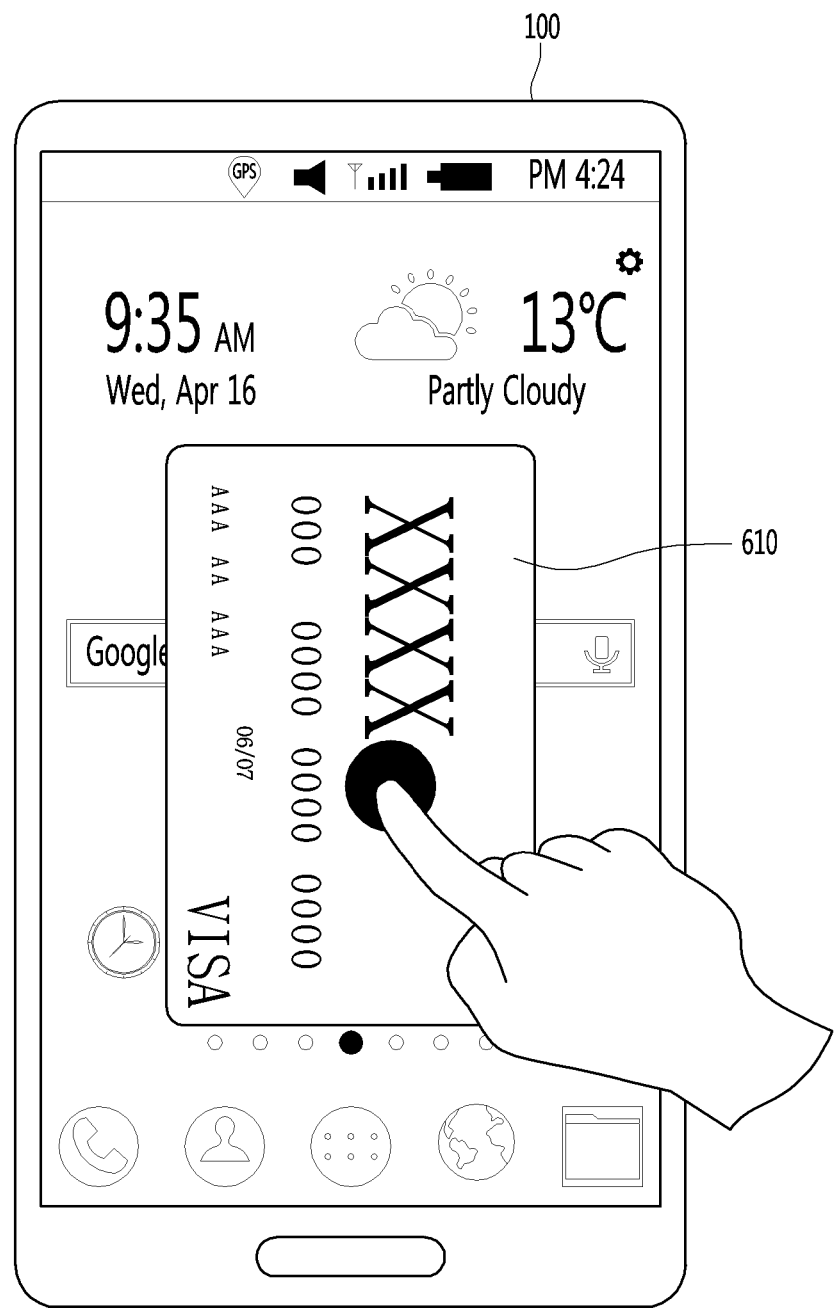
FIGS. 6 to 8 are views illustrating a user input for displaying information on a detail of a payment act performed by the mobile terminal, based on an image displayed on the mobile terminal, according to an embodiment of the present invention.
Figure 7:
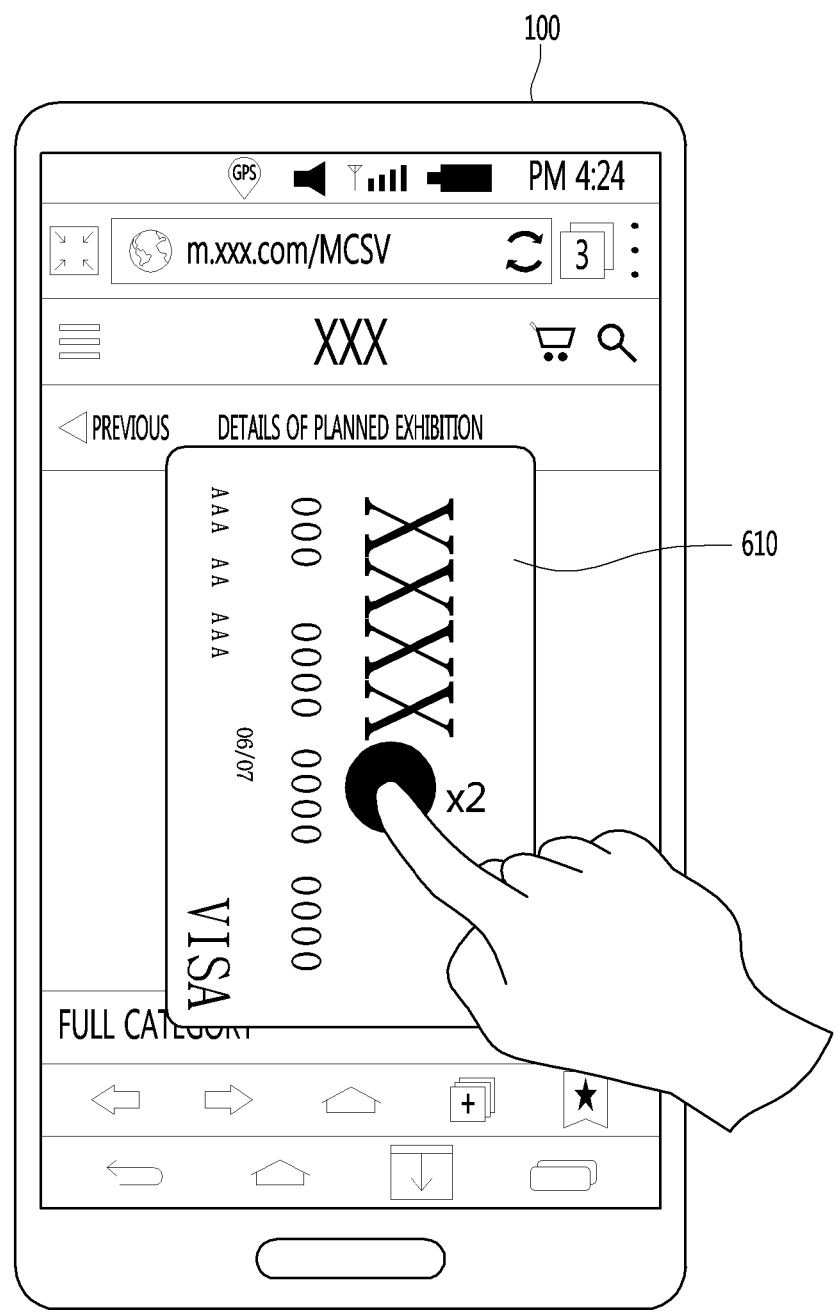
Figure 8:
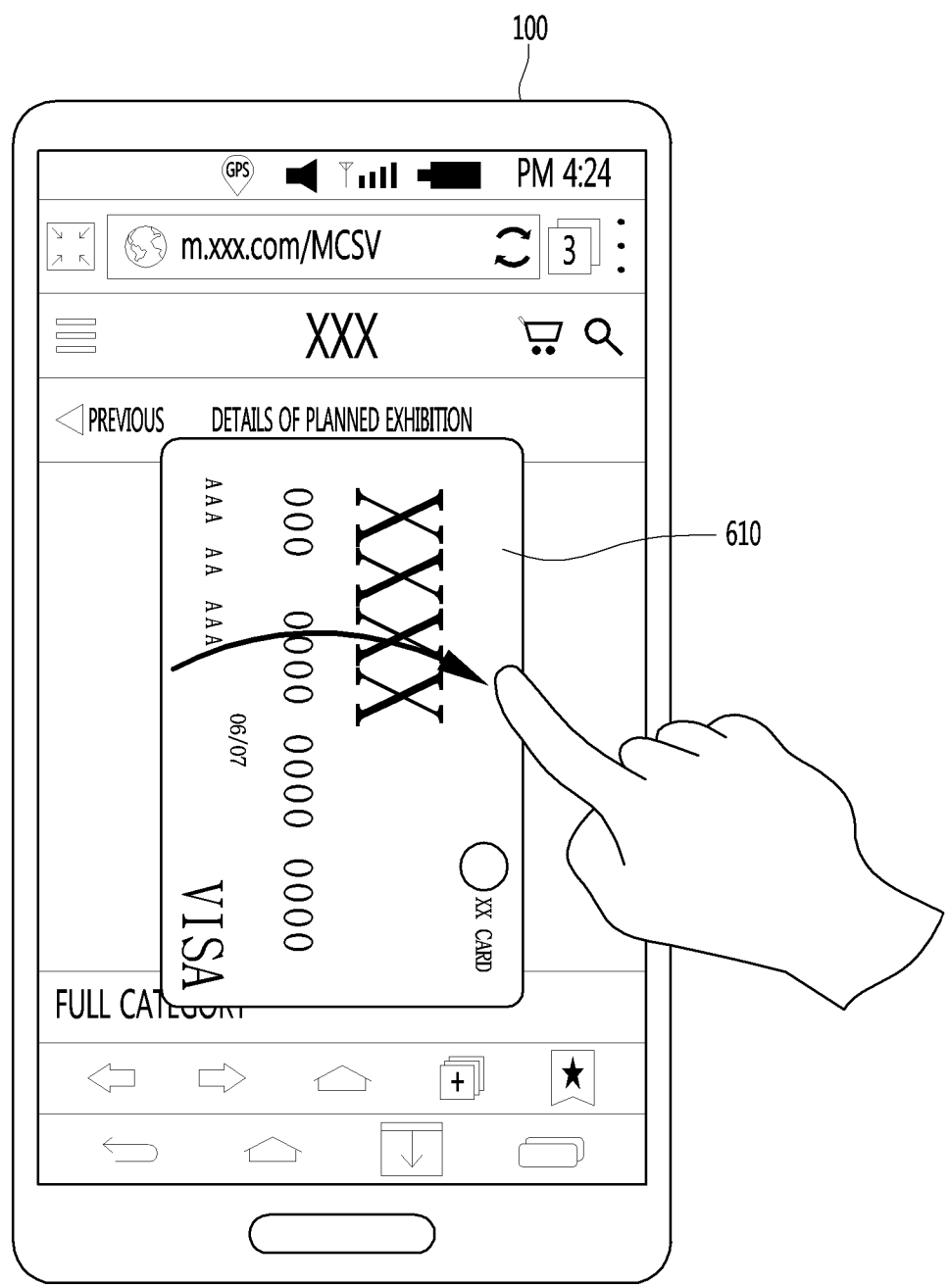

FIGS. 6 to 8 are view illustrating a user input for displaying information on the detail of the payment act performed by the mobile terminal based on the image displayed on the mobile terminal, according to an embodiment of the present invention.

If the payment application is executed, the controller 180 may display a card image 610 as illustrated in FIG. 6. In this case, the card image 610 may be an image corresponding to a card to be used for payment. For example, when an A card is preset to be used for payment, the card image 610 may be an image corresponding the A card. Meanwhile, as the card used for the payment is changed, the card image 610 may be changed.

Figure 9:
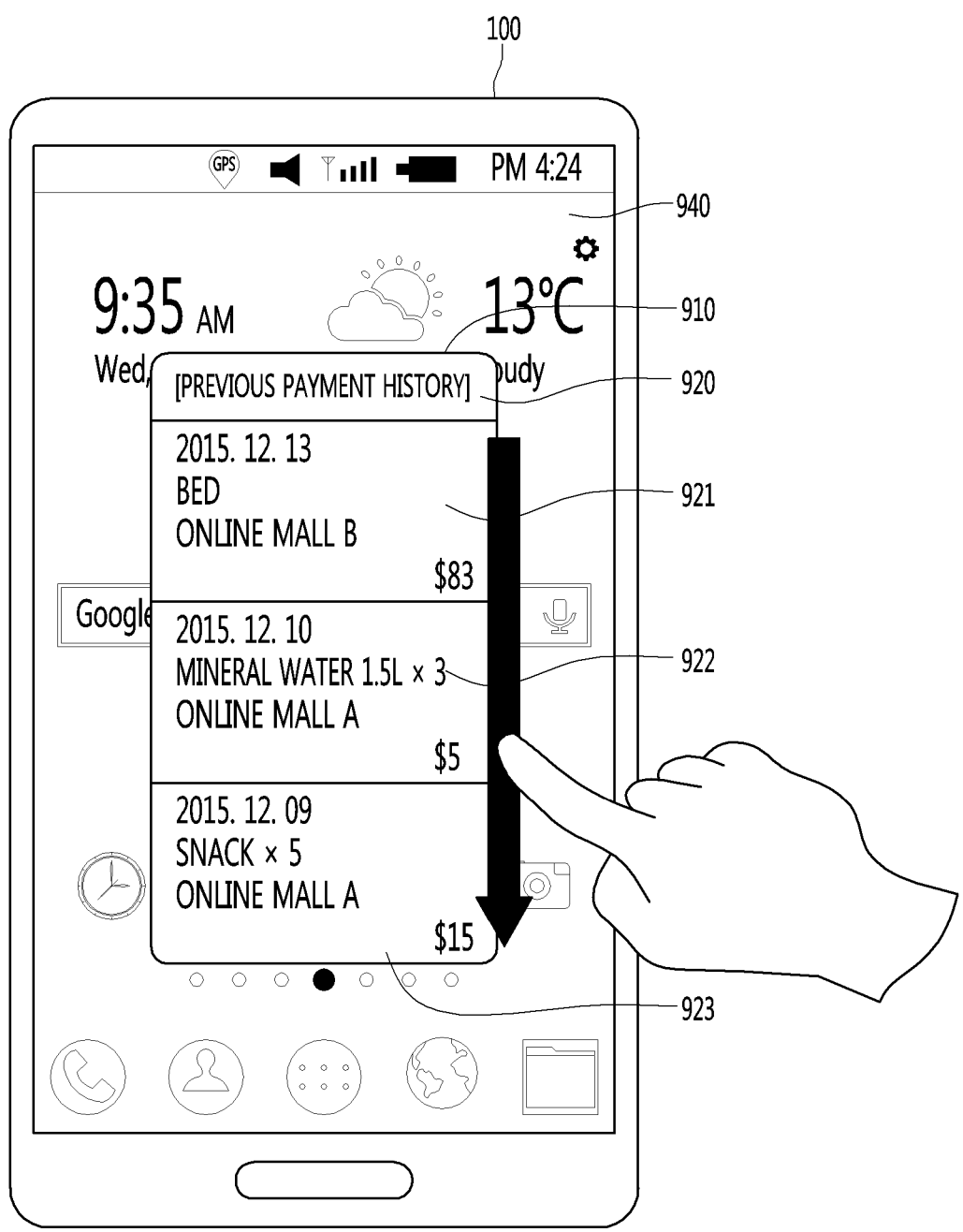
FIG. 9 is a view illustrating a mobile terminal on which information on the details of one or more payments performed by the mobile terminal, according to an embodiment of the present invention.

Meanwhile, if an input of a long touch to the card image 610 is received, the controller 180 may display information 920 on the one or more details of payment on the card image 610 as illustrated in FIG. 9.

By way of another example of displaying information on the details of the one or more payment acts, if an input of a double-touch to the card image 610 is received as illustrated in FIG. 7, the controller 180 may display information 920 on the one or more details of payment on the card image 610.

By way of still another example of displaying information on the details of the one or more payment acts, if an input of a flick-touch to the card image 610 is received as illustrated in FIG. 7B the controller 180 may display information 920 on the one or more details of payment on the card image 610.

FIG. 9 is a view illustrating a mobile terminal on which information on the detail of the payment act performed by the mobile terminal is displayed, according to an embodiment of the present invention.

If the payment application is performed, the controller 180 may display the information on the details of the one or more payment acts performed by the mobile terminal 100. For example, as illustrated in FIG. 9, the information 920 on the details of the one or more payment acts may include information on a first payment detail 921, information on a second payment detail 922, and information on a third payment detail 923.

Meanwhile, the information on the payment detail may include at least one of a date on which a payment act is performed, the name of a product purchased by the payment act, the number of products purchased, a payment amount, and a web-site on which the payment act is performed.

In detail, the controller 180 may store, in the storage unit 170, at least one of a date on which a payment act is performed, the name of a product purchased by the payment act, the number of products purchased, a payment amount, and a web-site on which the payment is performed, whenever the payment act is performed by the mobile terminal 100. If the payment act application is executed, the controller 180 may display the information 920 on the details of the one or more payment acts performed by the mobile terminal.

Meanwhile, the one or more information 921, 922, and 923 on one or more payment details are sorted in a descending order based on a payment date.

Meanwhile, information on one or more payment details 921, 922, and 923 displayed on the mobile terminal 100 may be a part of the whole payment details. The information on payment details, which are not displayed on the mobile terminal 100, of the information on the whole payment details may be displayed as an input of dragging the information the details 921, 922, and 923 of one or more payment acts is received.

If an input for authenticating a user is received in the state that the card image 610 is displayed, the controller 180 may directly make payment (that is, payment information may be transmitted).

In other words, the present invention is implemented such that a payment detail are displayed on the card image 610 through the simple handling by a user in the state that the card image 610 is displayed. Accordingly, the present invention may provide an environment that the user may determine the payment detail without separately searching for a menu for determining the payment detail.

In addition, the present invention may provide an environment that the user recognized the payment detail may instantly make payment through the authentication of the user, thereby simply performing the procedure of executing an application, determining the payment detail and making the payment.

Meanwhile, if the payment application is executed, the controller 180 may display the details of one or more payment acts performed by the mobile terminal, based on an image displayed on the mobile terminal, if the payment application is performed.

In this case, the image displayed on the mobile terminal 100 may be an image irrelevant to the payment act performed by the mobile terminal 100. The image irrelevant to the payment act performed by the mobile terminal 100 may be a remaining image, which is not an image of an execution screen of an application or an image of a web-page related to the payment act performed by the mobile terminal 100.

For example, if the payment application is executed in the state that a background screen 940, which is irrelevant to the payment act performed by the mobile terminal 100, is displayed, the controller 180 may display information on the one or more details of payment act performed by the mobile terminal 100.

In this case, the displayed information on the details of the one or more payment acts performed by the mobile terminal 100 may be information on details of the total payment acts performed by the mobile terminal 100.

In detail, if the payment application is executed in the state that an image, which is irrelevant to the payment act performed by the mobile terminal 100, is displayed, the controller 180 may display information on the details of the total payment acts performed by the mobile terminal 100 regardless of the web-page or the application which is not subject to the payment.

For example, the first payment detail 921 is the detail of a payment act performed on a web-page of "online mall B", and the second payment detail 922 is the detail of a payment act performed on a web-page of "online mall A". In this case, if the payment application is executed in the state that an image, which is irrelevant to the payment act performed by the mobile terminal 100, is displayed, the controller 180 may display information on the total details of the total payment acts performed by the mobile terminal 100, regardless of the web-page or the application which is not subject to the payment act.

When a user performs handling to determine a payment detail in the state that the image, which is irrelevant to the payment act performed by the mobile terminal 100, is displayed, the intent of the user may be regarded as being made to determine the detail of the payment act performed by the mobile terminal 100. Therefore, according to the present invention, if an input for determining the detail of a payment is received in the state that the image irrelevant to the payment act performed by the mobile terminal 100 is displayed, the user may be allowed to determine the details of the total payment acts performed by the mobile terminal 100.

Meanwhile, as an input for selecting a specific payment detail is received among details of one or more payment acts, the controller 180 may display an image of a web-page on which a product corresponding to the specific payment detail. The details thereof will be described with reference to FIG. 10.

Figure 10:
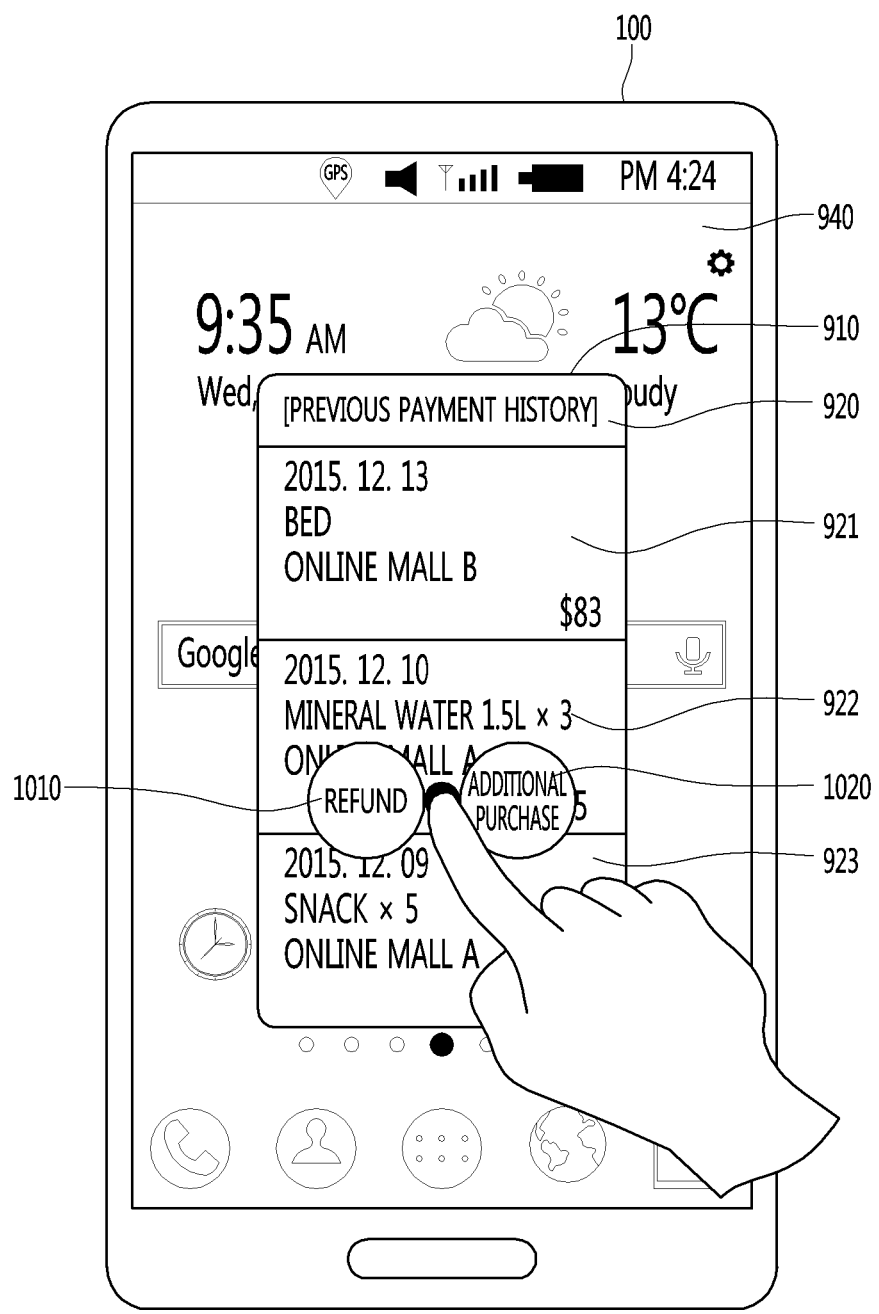
FIGS. 10 and 11 are views illustrating a method for purchasing a product by shifting to a page allowing the purchase of the product depending on an input for selecting a specific payment detail, according to an embodiment of the present invention.
Figure 11:
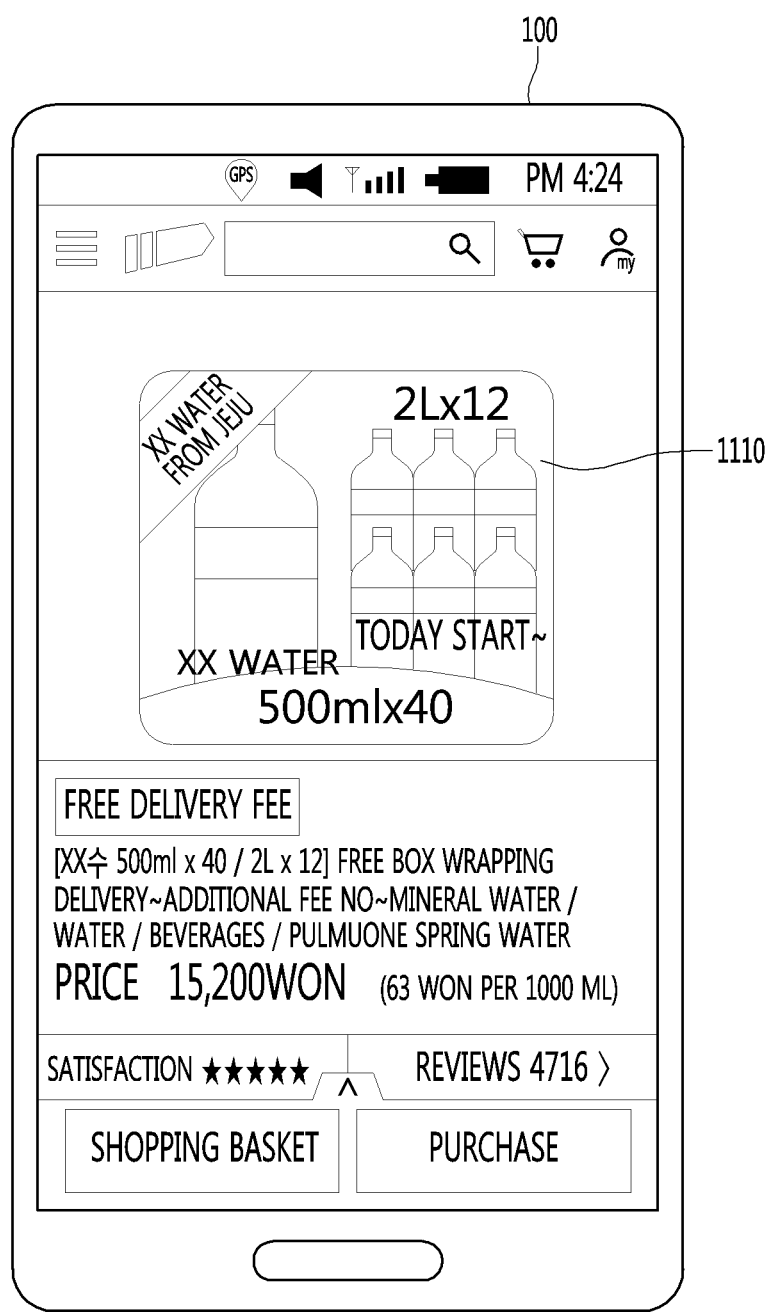

FIGS. 10 and 11 are views illustrating a method for purchasing a product through the shifting to the web-page for purchasing the product, based on an input of selecting the specific payment detail, according to an embodiment of the present invention.

The controller 180 may receive an input of selecting the information 922 on the specific payment detail from among information 921, 922, and 923 on the one or more details of payment which are displayed on the mobile terminal 100.

Meanwhile, when the input of selecting the information 922 on the specific payment detail is received, the controller 180 may display the web-page for purchasing a product corresponding to the specific payment detail.

In detail, whenever the payment act is made on the mobile terminal 100, the controller 180 may store, in the storage unit 170, at least one of a date on which a payment act is performed, the name of a product purchased by the payment act, the number of products purchased, a payment amount, and a web-site on which the payment act is performed. In this case, the information on the web-page on which the payment act is performed may include an address of a web-page for purchasing the product.

Meanwhile, when the input of selecting the information 922 on the specific payment detail is received, the controller 180 may link to the web-page for purchasing a product corresponding to the specific payment detail, based on the address of the web-page for purchasing the product, which is stored in the storage unit 170, and may display an image 1110 of the web-page for purchasing the product as illustrated in FIG. 11.

For example, the second payment detail 922 may be a payment detail of mineral water B purchased through the mobile terminal 100. Meanwhile, when the second payment detail 922 is selected from one or more payment details 921, 922, and 923, the controller 180 may display an image of a web-page for purchasing the mineral water B, based on the address of a web-page stored when the mineral water B was purchased in the past.

Meanwhile, although the present embodiment has been described in that the image of the web-page for purchasing the product is displayed based on the address of the web-page stored in the past, the present invention is not limited thereto.

In detail, when an input for selecting the specific payment detail is received, the controller 180 may display the searching result for web-pages for purchasing the product corresponding to the specific payment detail.

For example, when the second payment detail 922 is selected from one or more payment details 921, 922, and 923, the controller 180 may search for a web-page for purchasing the mineral water B, based on the mineral water "B" or other information stored in the storage unit 170 and may display the searching result.

For another example, when the second payment detail 922 is selected from one or more payment details 921, 922, and 923, the controller 180 may search for a web-page for purchasing the mineral water B, based on the mineral water "B" or other information stored in the storage unit 170, may link to the web-page, and may display an image of the linked web-page.

Meanwhile, although the present embodiment has been described in that, when the input of selecting the information 922 on the specific payment detail is received, the web-page for purchasing the product corresponding to the specific payment detail is directly displayed, the present invention is not limited thereto.

In detail, as illustrated in FIG. 10, when the input of selecting the information 922 on the specific payment detail is received, the controller 180 may display a user interface 1010 for the refund of the product corresponding to the specific payment detail and a UI 1020 for purchasing a product corresponding to the specific payment detail.

Meanwhile, if an input of selecting the UI 1020 for purchasing the product corresponding to the specific payment detail is received, the controller 180 may display the web-page for purchasing the product corresponding to the specific payment detail.

Meanwhile, if an input of selecting the UI 1010 for the refund of the product corresponding to the specific payment detail is received, the controller 180 may display an image related to the refund of the product and may perform a procedure for the refund of the product based on the operation by the user.

As described above, the present invention provides an environment of performing a re-purchasing or re-funding procedure through a simple touch, when there is a product for the re-purchase or the refund desired by the user who has determined the details of the total payment acts performed by the mobile terminal 100.

Meanwhile, if the payment application is executed, the controller 180 may display information on details of one or more payments performed by the mobile terminal 100, based on an image displayed on the mobile terminal 100. In this case, the image displayed on the mobile terminal 100 may be an image of a web-page related to a payment act performed by the mobile terminal 100.

The details thereof will be described with reference to FIGS. 12 to 14 in detail.

Figure 12:
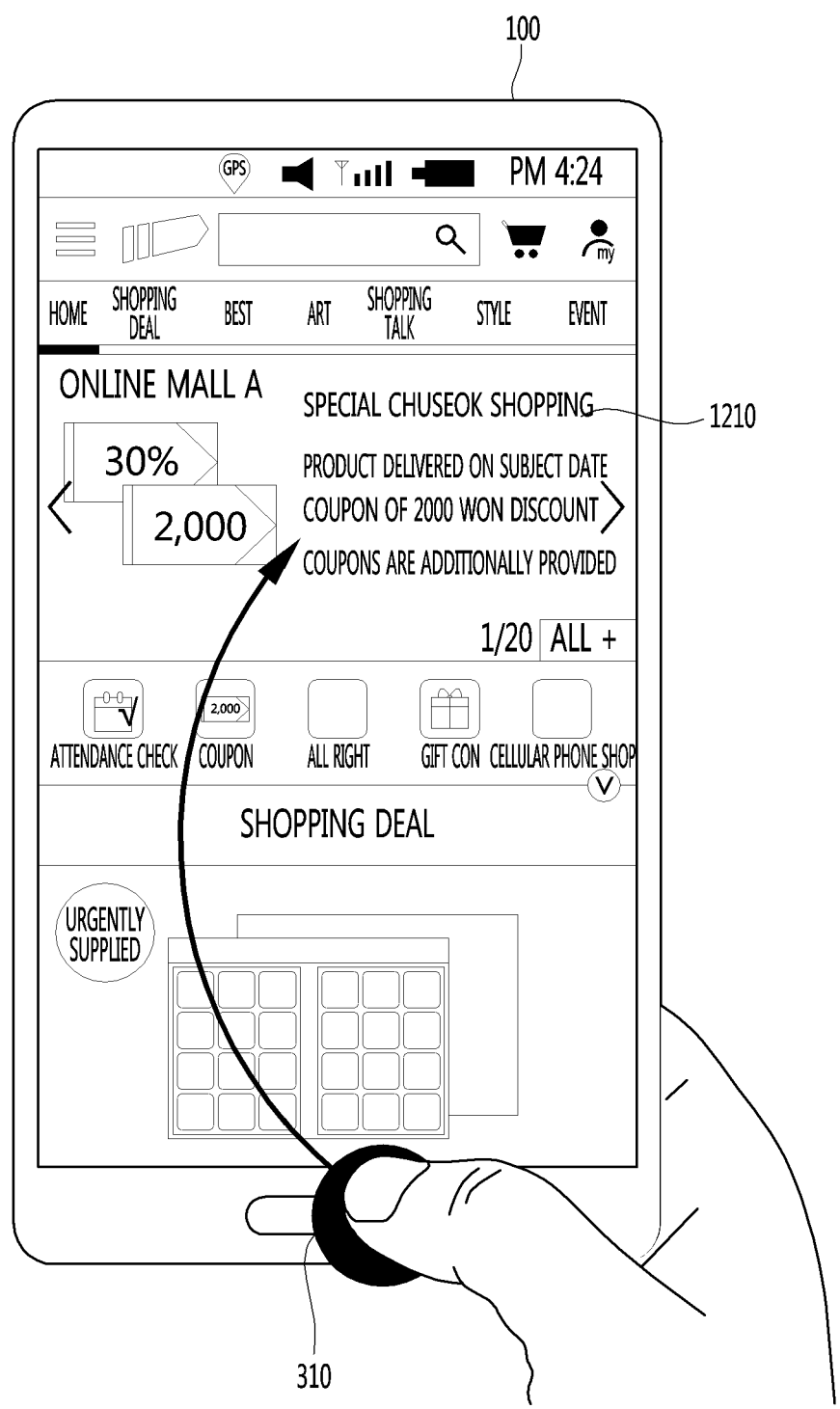
FIGS. 12 to 14 are views illustrating a method for displaying information on a payment detail in the state that the image of a web-page related to the payment act performed by the mobile terminal is displayed.
Figure 13:
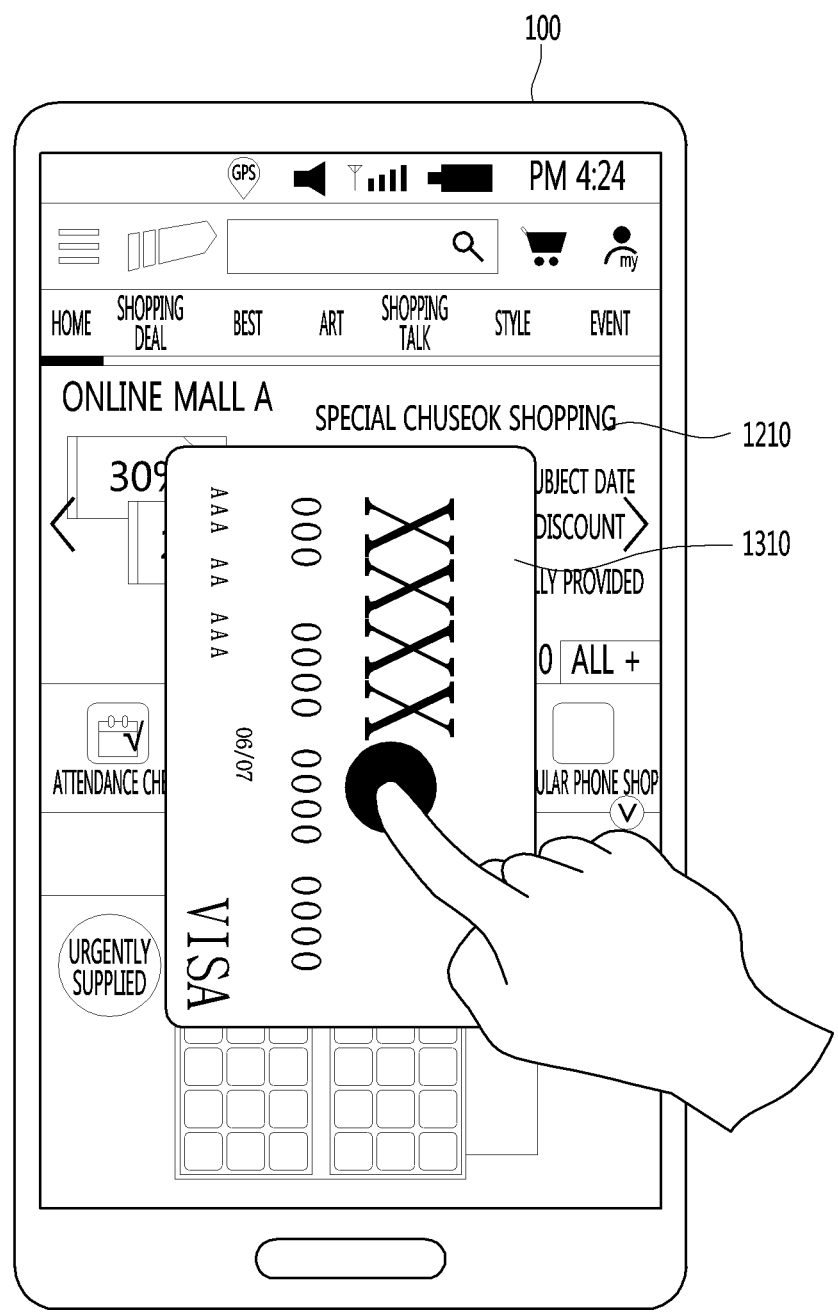
Figure 14:
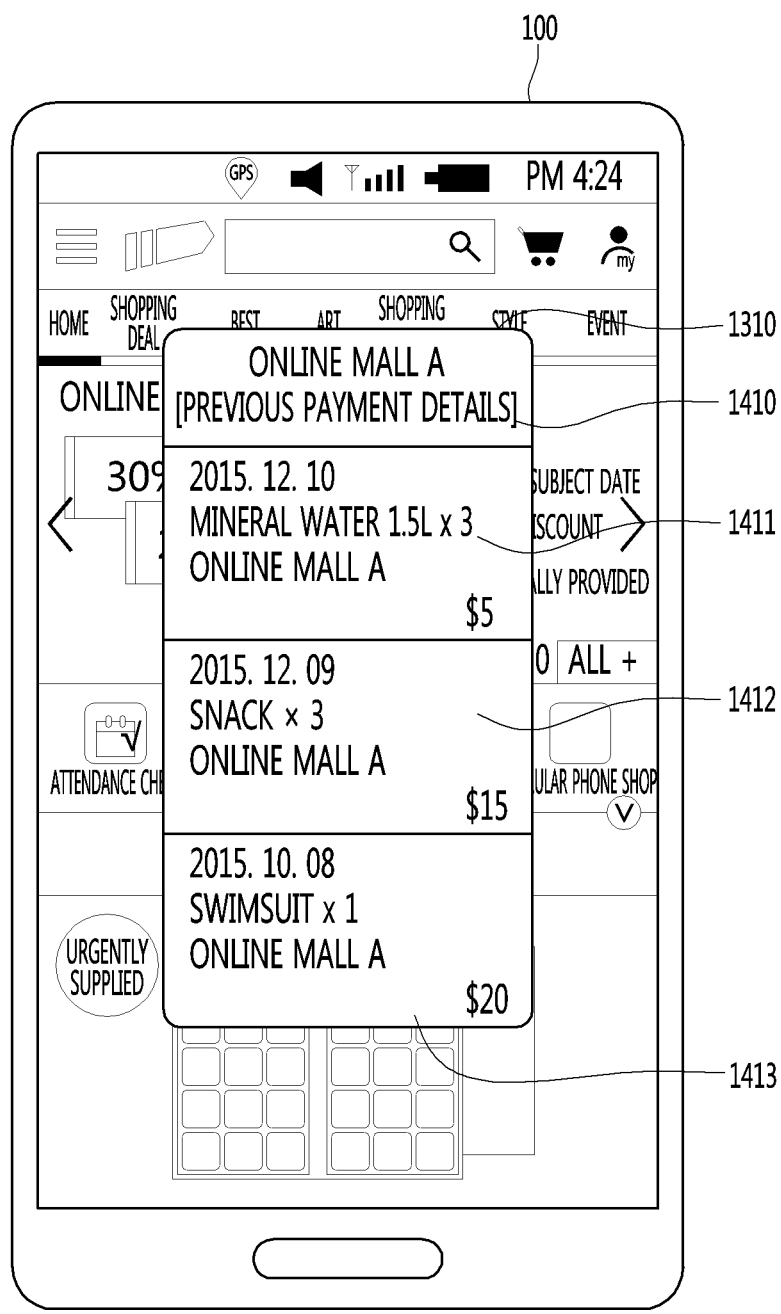

FIGS. 12 to 14 are views illustrating a method for displaying information on a payment detail in the state that the image of a web-page related to the payment act performed in the mobile terminal is displayed.

Referring to FIG. 12, currently, an image 1210 of the web-page related to the payment act performed in the mobile terminal 100 is displayed on the mobile terminal 100.

In this case, the web-page related to the payment act performed in the mobile terminal 100, which is a web-page for purchasing a product, may be a web-page on which a product provided for sale on a web-page has been purchased by using the payment application of the mobile terminal 100.

For example, when a user has purchased a product by using one payment application installed in the mobile terminal 100 on a web-page of "online mall A", the web-page related to the payment act performed on the mobile terminal 100 may be a web-page of "online mall A".

Meanwhile, if the payment application is executed in the state that the image 1210 of the web-page related to the payment act performed on the mobile terminal 100 is displayed, the controller 180 may display information on details of one or more payment acts performed on the web-page.

In detail, the controller 180 may store information on the payment detail whenever the payment is performed. In more detail, the controller 180 may store, in the storage unit 170, information on at least one of a date on which a payment is performed, the name of a product purchased by the payment, the number of products purchased, a payment amount, a web-site on which the payment is performed, and a vendor receiving the payment.

Meanwhile, as illustrated in FIG. 12, if the input for executing the payment application is received in the state that the image 1210 of the web-page related to a payment act performed by the mobile terminal 100 is displayed, the controller 180 may display a card image 1310 as illustrated in FIG. 13.

Meanwhile, if an input of selecting the card image 1310 is received, the controller may display information 1410 on payment details, as illustrated in FIG. 14.

Meanwhile, the information 1410 on the payment details may include information 1411, 1412, and 1413 on one or more payment details made on a web-page which is currently displayed.

In detail, the controller 180 may display the information 1411, 1412, and 1413 on one or more payment details made on the web-page which is currently displayed, based on information on a web-page, on which payment has been performed, stored in the storage unit 170.

For example, the first payment detail 1411, the second payment detail 1412, and the third payment detail 1413 are payment details of products purchased by using the mobile terminal 100 on the currently-displayed web-page, that is the web-page of "online mall A".

In other words, if the payment application is executed in the state that the image 1210 of the web-page related to the payment act performed by the mobile terminal 100 is displayed, the controller 180 may display the information 1411, 1412, and 1413 on the payment details, which are made on the web-page, from among the total payment details.

Meanwhile, the web-page related to the payment act performed by the mobile terminal 100 may include all web-pages managed to purchase products in a specific vendor as well as the web-page on which the product has been purchased.

For example, on the assumption that the web-page of "online mall A" includes a home page, a web-page for purchasing product b, a web-page for purchasing product c, and a web-page for guiding a coupon, the web-page relate to the payment act performed by the mobile terminal 100 may include all the web-page of "online mall A", the home page, the web-page for purchasing product b, the web-page for purchasing product c, and the web-page for guiding a coupon.

In this case, the controller 180 may display information on the payment detail made on the currently-displayed web-page, based on the address of the web-page stored in the storage unit 170 and the address of the currently-displayed web-page.

In detail, if a part of the address of the web-page currently displayed is matched with a part of the address of the web-page, on which a specific product has been purchased, stored in the storage unit 170, the controller 180 may display information on a payment detail of a specific product, which serves as information on the payment detail made on the currently-displayed web-page.

For example, when the address of the currently-displayed web-page is "http://www.Aonlinemall.com/, and the address of the web-page, on which mineral water is purchased, stored in the storage unit 170 is "http://www.Aonlinemall.com/water", the controller 180 may display information on the payment detail performed on the web-page having the address of "http://www.Aonlinemall.com/water".

When a user performs handling to determine the payment details in the state that a web-page managed by a vendor selling various products is displayed, the intent of the user may be regarded as being made to determine the payment detail of the product purchased from the above company. Therefore, according to the present invention, when an input for determining payment details is received in the state that the specific web-page is displayed, the payment details made on the specific web-page may be determined.

In other words, according to the present invention, a payment detail required by a user may be selectively provided from among numerous payment details held by the mobile terminal 100.

Figure 15:
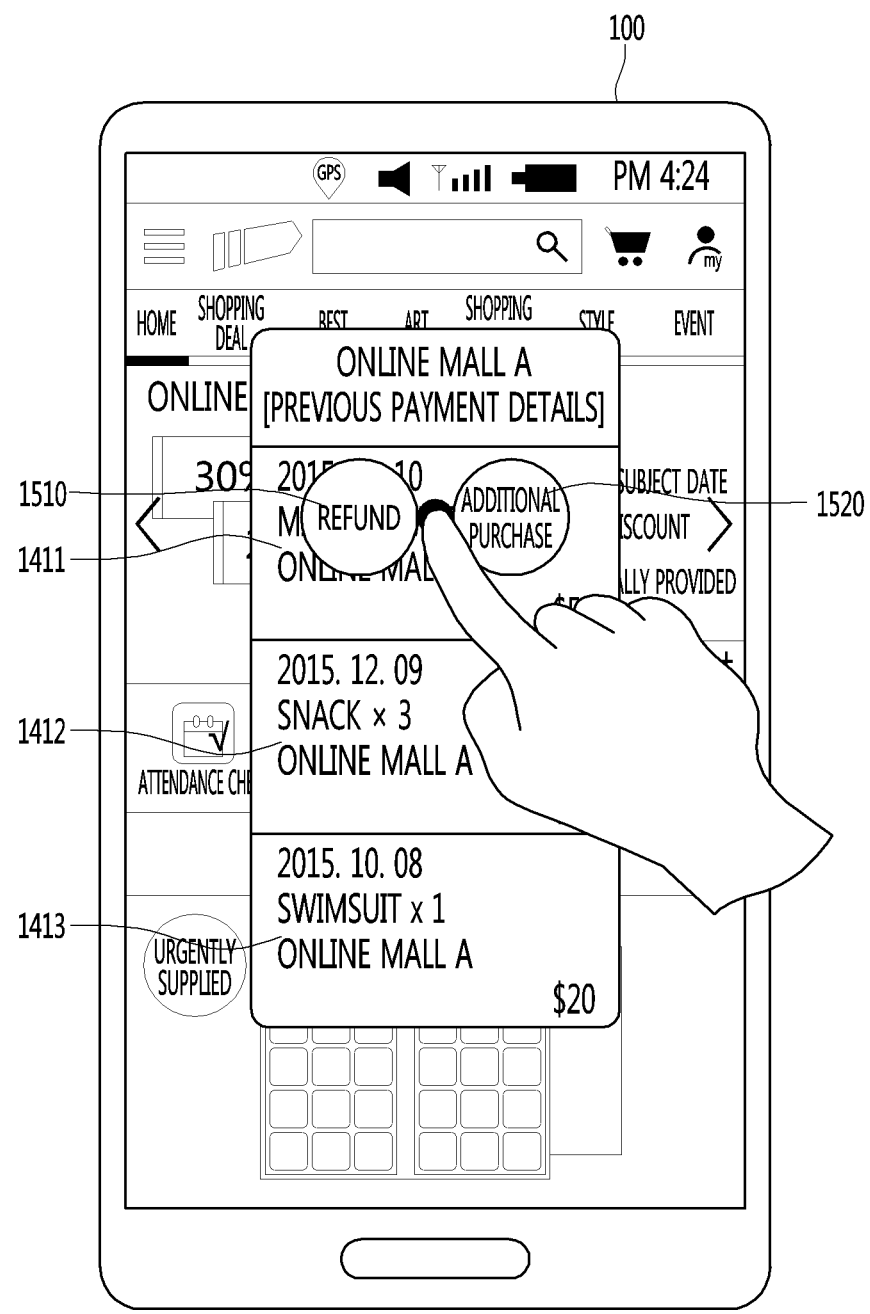
FIGS. 15 and 16 are views illustrating a method for purchasing a product through the shifting to a page allowing a user to purchase the product depending on an input of selecting a specific payment detail, according to an embodiment of the present invention.
Figure 16:
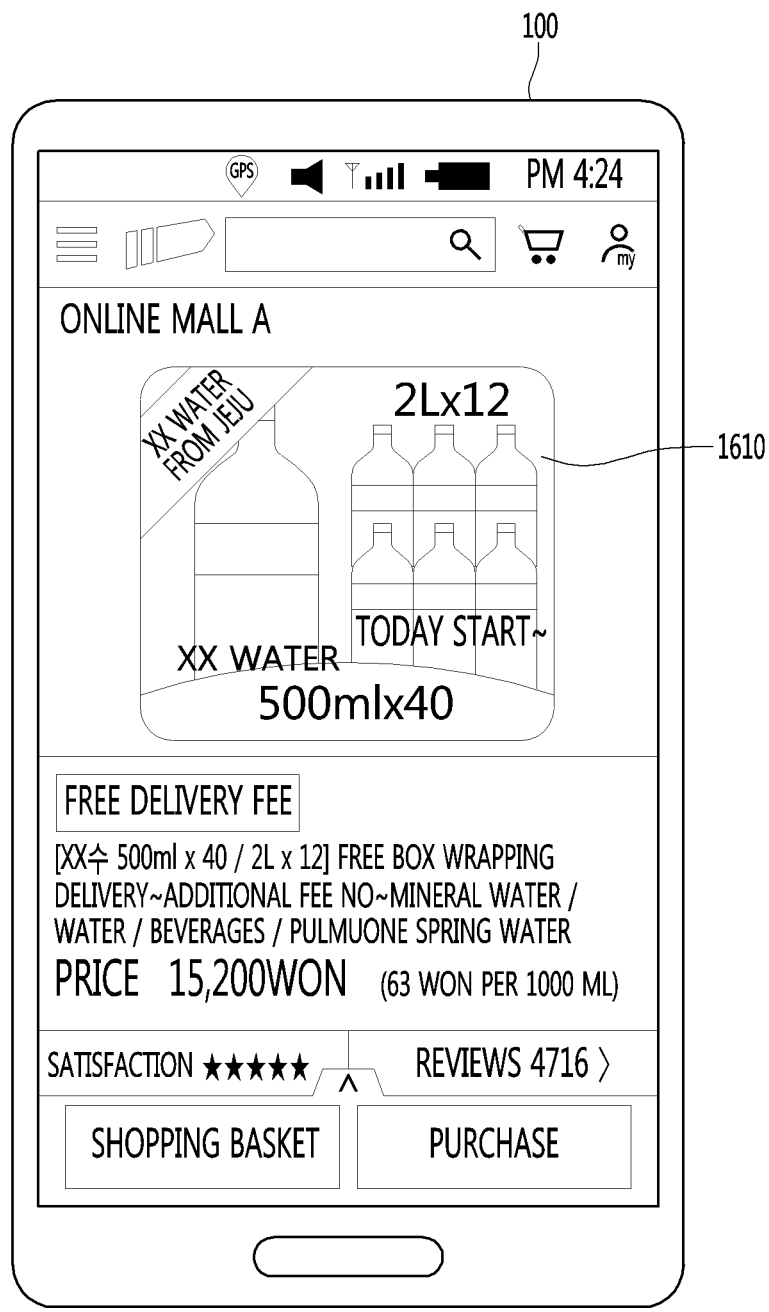

FIGS. 15 and 16 are views illustrating a method for purchasing a product through the shifting to a page allowing a user to purchase the product depending on an input of selecting a specific payment detail, according to an embodiment of the present invention.

If the input of selecting information 1411 on a specific payment detail is received from among the information 1411, 1412, and 1413 on one or more payment details displayed on the mobile terminal 100 as illustrated in FIG. 15, the controller 180 may display an image 1610 of a web-page for purchasing a product corresponding to a specific payment detail, as illustrated in FIG. 16.

For example, when the address of the currently-displayed web-page is "http://www.Aonlinemall.com/, and the address of the web-page, on which mineral water is purchased, stored in the storage unit 170 is "http://www.Aonlinemall.com/water", and the input of selecting the information 1411 on the payment detail corresponding to the mineral water is received, the controller 180 may link to the web-page having the address of http://www.Aonlinemall.com/water, and may display an image of the web-page having the address of http://www.Aonlinemall.com/water.

In addition, similarly to the description made with reference to FIGS. 10 to 11, the controller 180 may display a searching result for a web-page for purchasing a product corresponding to the specific payment detail, may link to the found web-page, and may display an image of the web-page.

Meanwhile, similarly to the description made with reference to FIG. 10, if the input of selecting the information 1411 on the specific payment details is received, the controller 180 may display a UI 1510 for the refund of a product corresponding to the specific payment detail and a UI 1520 for purchasing the product corresponding to the specific payment detail. If an input of selecting the UI 1520 for purchasing the product corresponding to the specific payment detail is received, the controller 180 may display a web-page for purchasing the product corresponding to the specific payment detail.

In addition, if the UI 1510 for the refund of the product corresponding to the specific payment detail is received, the controller 180 may display an image related to the refund of the product and may perform a procedure for the refund of the product based on the operation by the user.

As described above, the present invention provides an environment of performing a re-purchasing or refunding procedure through a simple touch, when there is a product for the re-purchase or the refund desired by the user who has determined the payment detail made on the specific web-page.

FIGS. 17 to 20 are views illustrating a method for displaying a payment detail in the state that an execution screen of a messenger application is displayed, according to an embodiment of the present invention.

Currently, an execution screen 1710 of the messenger application has been displayed on the mobile terminal 100.

If the messenger application is executed in the state that the execution screen 1710 of the messenger application, which includes a keyword 1711, the controller 189 may display information on one or more payment details made by a vendor corresponding to the keyword 1711.

In detail, the execution screen 1710 of the messenger application may include a chat window. The chat window may include the keyword 1711. In this case, the keyword may be a word corresponding to a specific vendor performing payment through the mobile terminal 100.

In more detail, when the payment is performed by using the mobile terminal 100, the controller 180 may store information on a vendor receiving a payment. For example, when the payment is performed in "café D" through the mobile terminal 100, the controller 180 may store, in the storage unit 140, information on the vendor receiving the payment, which is "café D".

In this case, the payment may be performed on line or off line. In detail, when the payment is performed through the mobile terminal 100 on a web-page of a specific company, the controller 180 may store information on the vendor receiving the payment.

Meanwhile, even if a user who visits a specific vendor make payment through the mobile terminal 100 inside the specific company, the controller 180 may store information on the specific vendor receiving the payment.

Meanwhile, information on a payment detail, for example, information on a vendor receiving payment may be acquired based on a payment receipt received by the mobile terminal 100.

Meanwhile, when the keyword included in the execution screen 1710 of the messenger application corresponds to information on the companying receiving the payment, which is stored in the storage unit, the controller 180 may display information on details of one or more payment acts performed by the vendor corresponding to the keyword.

Figure 17:
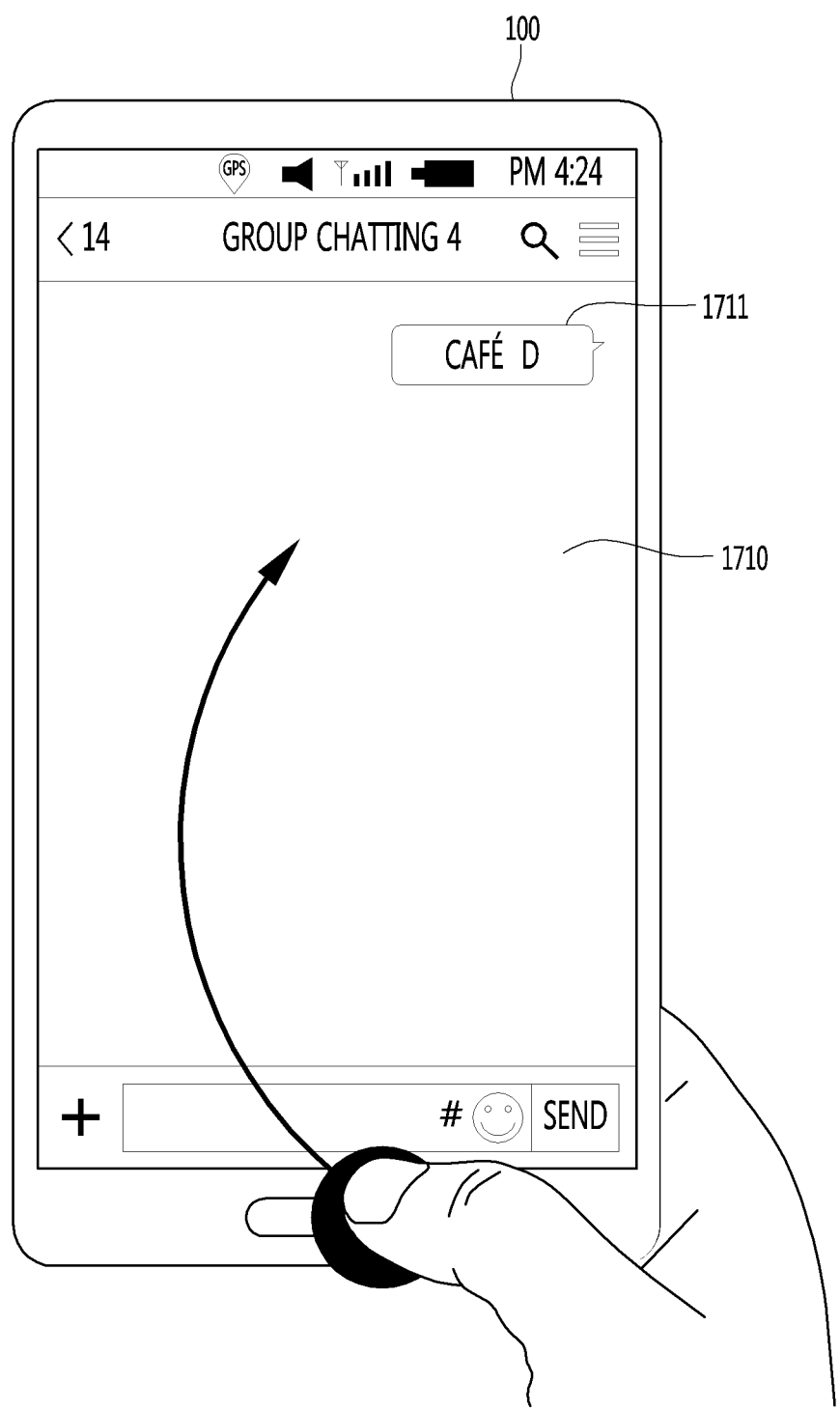
FIGS. 17 to 20 are views illustrating a method for displaying a payment detail in the state that an execution screen of a messenger application is displayed, according to an embodiment of the present invention.
Figure 18:
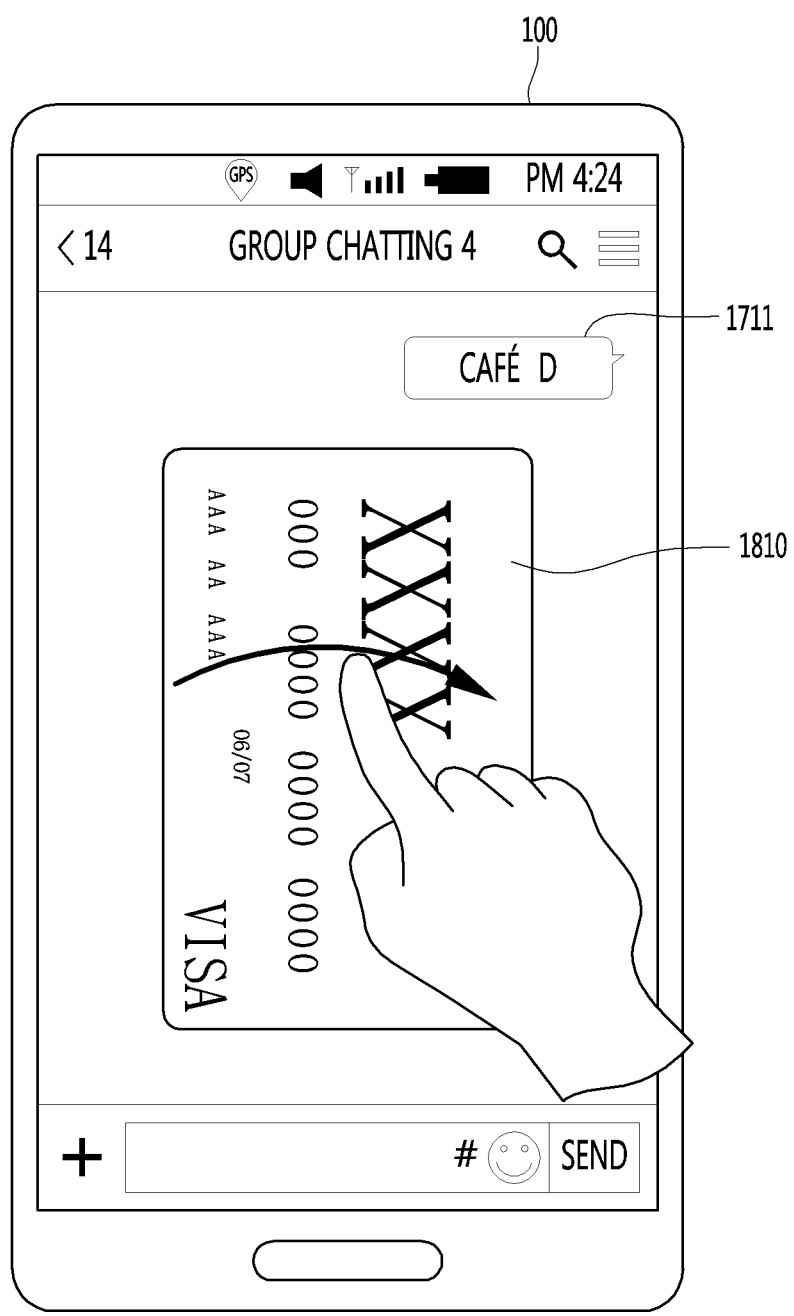

In detail, if the messenger application is performed in the state that the execution screen 1710 of the messenger application including the keyword 1711 is displayed as illustrated in FIG. 17, the controller 180 may display a card image 1810 as illustrated in FIG. 18.

Figure 19A:
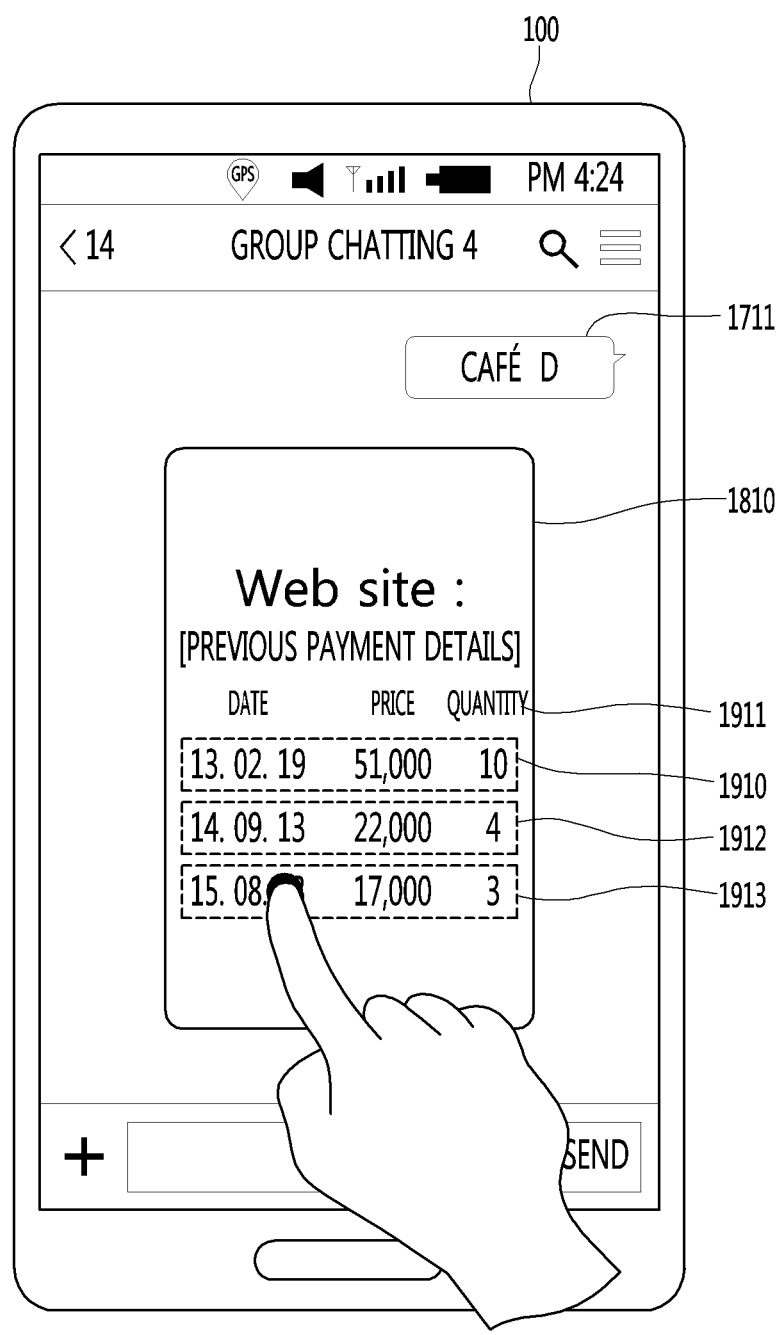

In addition, when an input of selecting the card image 1810 is received, the controller 180 may display information on details of one or more payment acts performed by the vendor corresponding to the keyword as illustrated in FIG. 19A.

In detail, when the portion or the entire portion of the information on the vendor receiving the payment, which is stored in the storage unit 140, is matched with a portion or the entire portion of the keyword, the controller 180 may display information on details of one or more payment acts performed by the vendor corresponding to the keyword.

For example, when the information on the vendor receiving the payment, which is "café D", is stored in the storage unit 140 and the keyword is "café D", the controller 180 may display information 1910 on a detail of a payment act performed in café D.

Meanwhile, the information 1910 on the detail of a payment act performed by a vendor corresponding to the keyword may include information 1911, 1912, and 1913 on details of one or more payment acts performed by the vendor corresponding to the keyword.

Figure 19B:
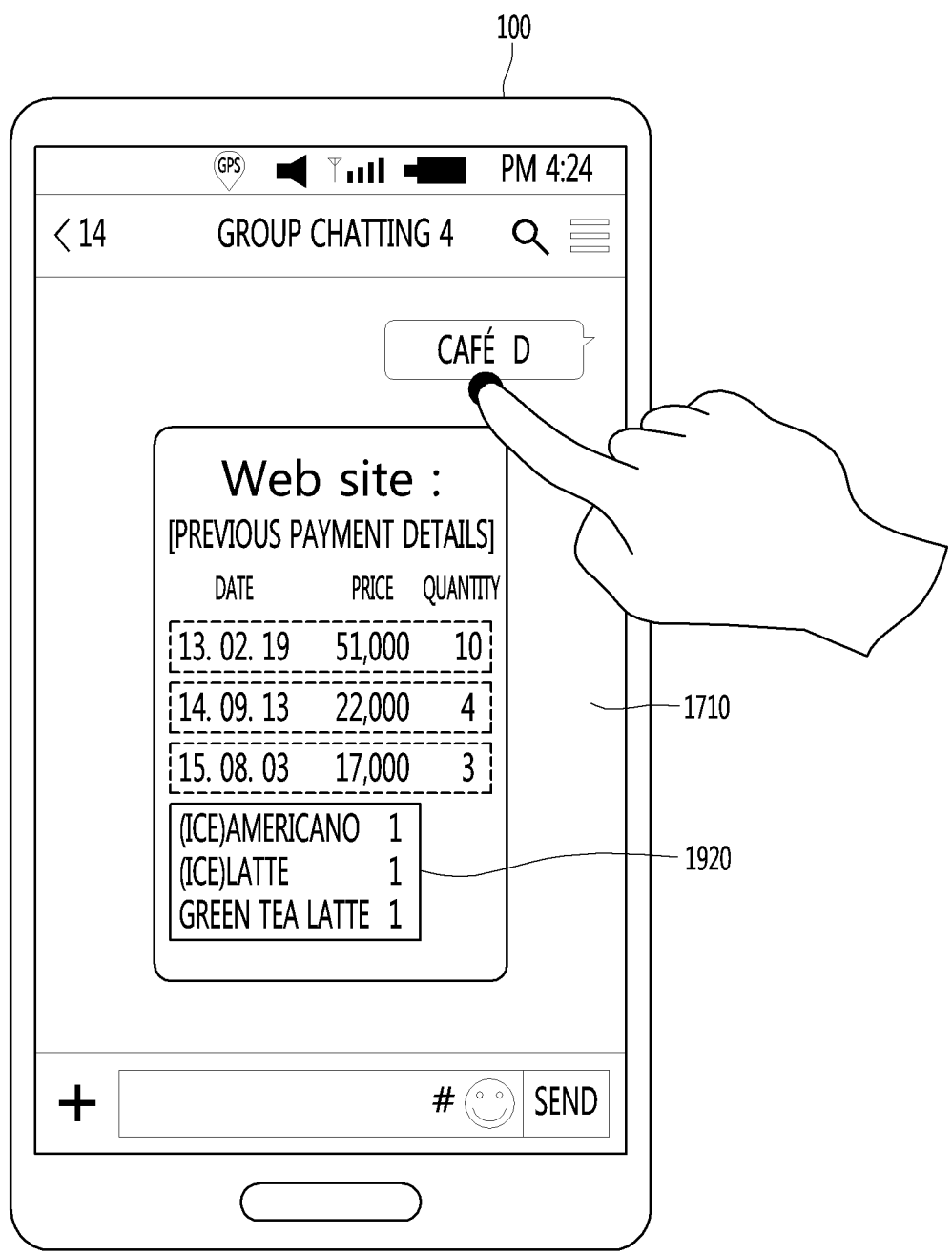

Meanwhile, the information on the payment detail may include detailed information of the payment detail. In detail, when an input of selecting information 1913 on a specific payment detail is received from among the information 1911, 1912, and 1913 on one or more details of payment, the controller 180 may display detailed information 1920 of the specific payment detail 1913 as illustrated in FIG. 19B.

In this case, the detailed information 1920 of the specific payment detail 1913 may include at least one of the name of a product purchased, the number of products purchased, and the price of the purchased product.

As described above, according to the present invention, only if a user performs handling of inputting a keyword in a messenger chat window, the user may recognize the payment details for the vendor corresponding to the keyword.

Meanwhile, as receiving an input for touching and dragging information 1913 on the specific payment detail among the information 1911, 1912, and 1913 of one or more details of payment, which is performed by the vendor corresponding to the keyword, on the execution screen 1710 of the messenger application, the controller 180 may display the information 1913 on the specific payment detail on the execution screen 1710 of the messenger application.

Figure 20:
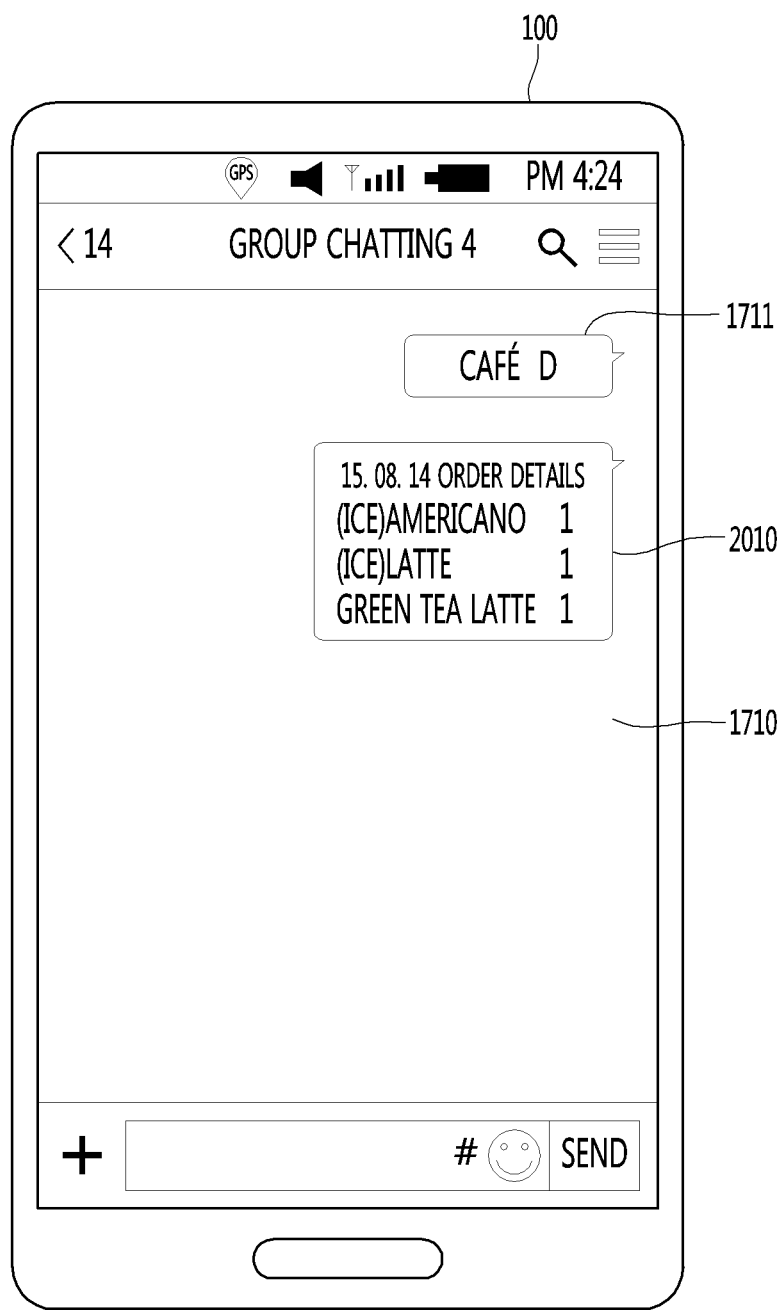

In detail, when receiving an input for touching and dragging information 1913 on the specific payment detail among the information 1911, 1912, and 1913 of one or more details of payment, which is performed by the vendor corresponding to the keyword, on the execution screen 1710 of the messenger application, the controller 180 may display detailed information 2010 on the specific payment detail on a chat window included in the execution screen 1710 of the messenger application as illustrated in FIG. 20.

As described above, according to the present invention, only if a user performs handling of inputting a keyword in a messenger chat window, the user may easily recognize the payment details for the vendor corresponding to the keyword and may share the payment details with another person.

Meanwhile, the mobile terminal 100 may perform payment based on a text input in the chat window. The details thereof will be described in detail with reference to FIGS. 21 to 23.

Figure 21:
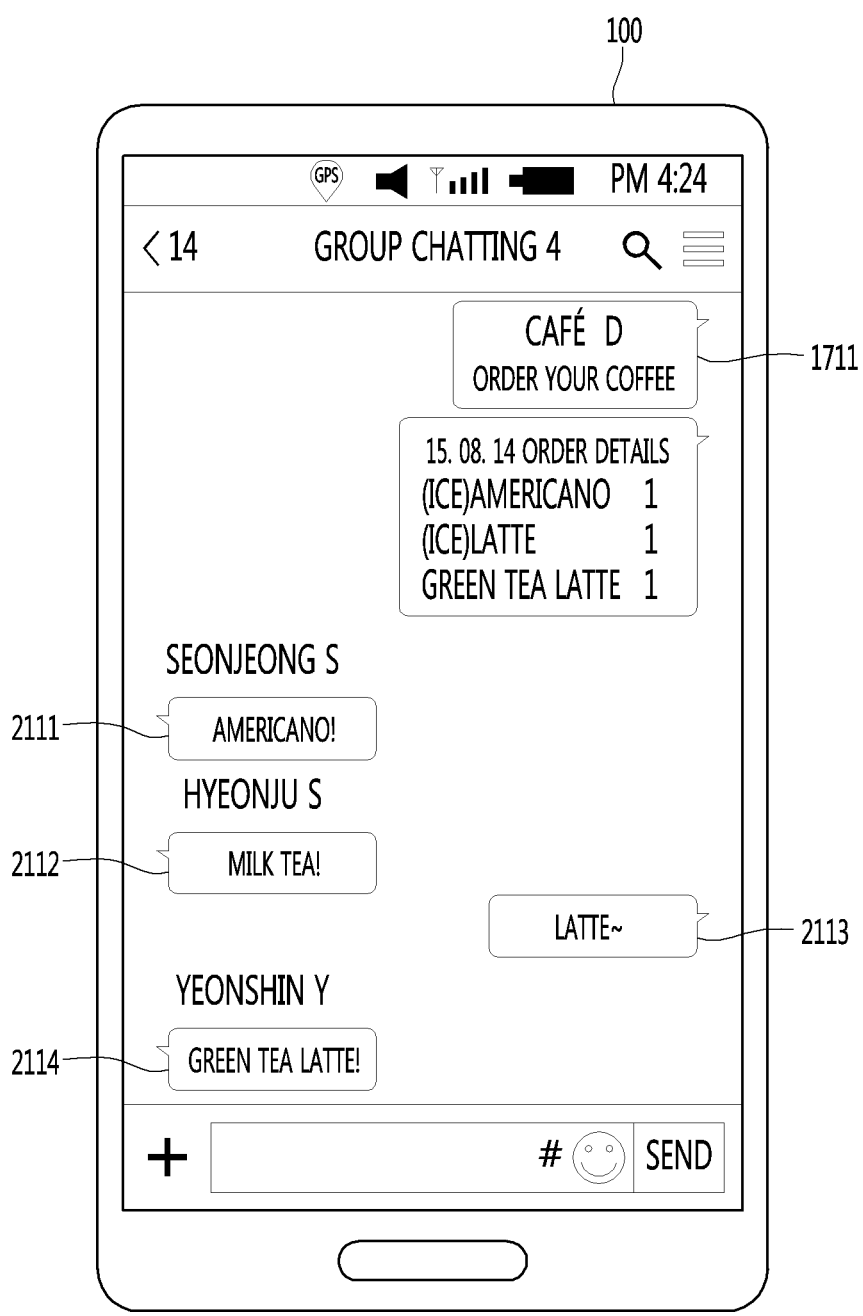
FIGS. 21 to 23 are views illustrating a method for performing a payment act based on a text displayed on a chat window, according to an embodiment of the present invention.
Figure 22:
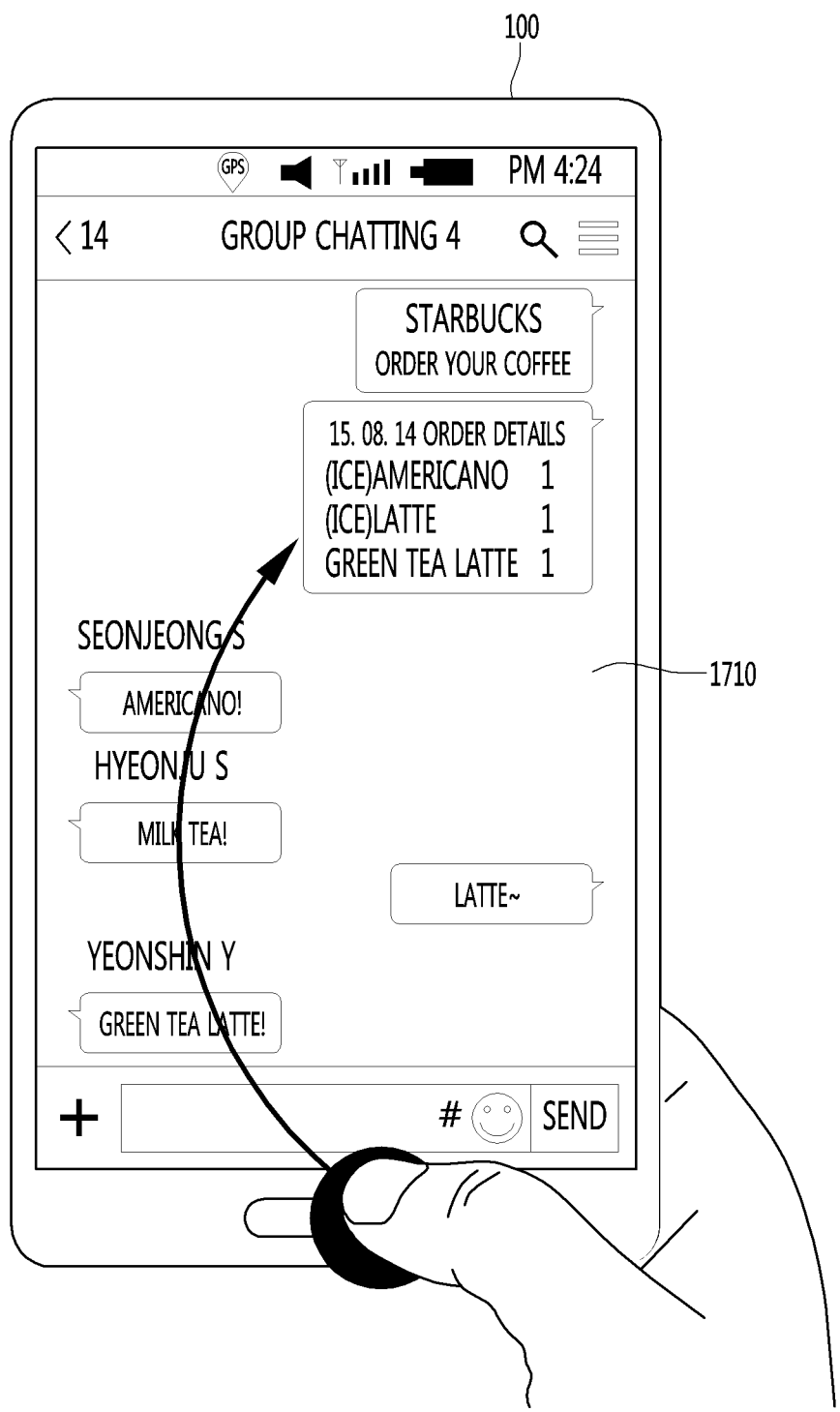
Figure 23:
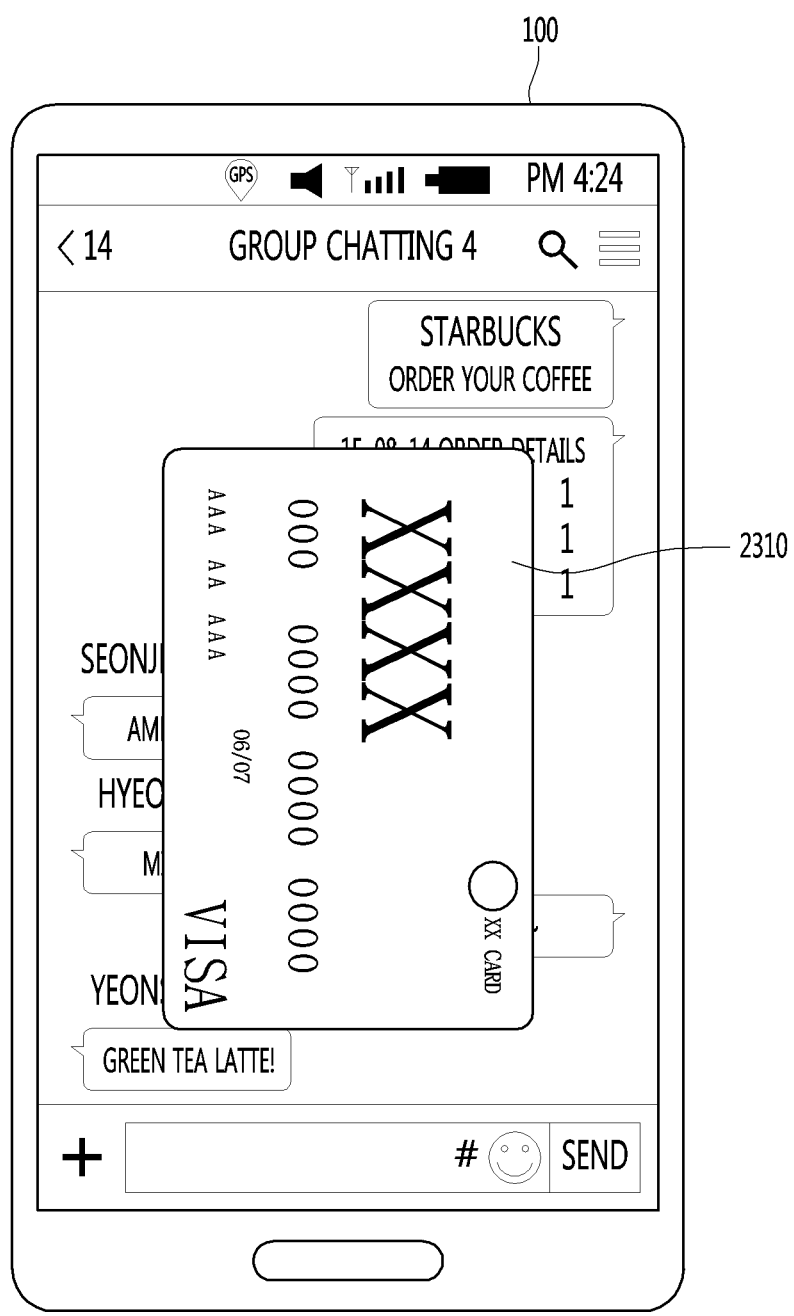

FIGS. 21 to 23 are views illustrating a method of performing payment based on a text displayed on a chat window, according to an embodiment of the present invention.

As illustrated in FIG. 21, the chat window included in the execution screen 1710 of the messenger application may include texts 2111, 2112, 2113, and 2114 corresponding to products.

On the other hand, the controller 180 may perform payment for the products corresponding to the texts 2111, 2112, and 2113 included in the chat window, based on the texts 2111, 2112, and 2113, and 2114 corresponding to the product and the keyword 1711.

Specifically, the controller 180 can acquire information on a vendor having a product to be purchased using the mobile terminal 100, based on the keyword 1711. For example, when the keyword 1711 is "café D, the controller 180 may determine the vendor having the product to be purchased as being "café D".

In addition, the controller 180 may acquire information on the products to be purchased based on the texts 2111, 2112, 2113, and 2114 included in the chat window. For example, when the texts 2111, 2112, 2113, and 2114 included in the chat window are "Americano", "Milk tea", "Lane", "Green tea latte", the controller 180 determines products to be purchased as being Americano, Milk tea, Latte, AND Green tea latte.

Meanwhile, the controller 180 can perform payment, based on information on a vendor having a product to be purchased and information on the product to be purchased.

For example, the controller 180 may link to a web-page for purchasing purchases, based on information on the vendor having products to be purchased and information on the products to be purchased and may display an image of the linked web-page. In this case, the payment for products to be purchased may be made depending on the operation of a user based on the image of the web-page.

For another example, the controller 180 may access a server (not illustrated) including a payment system and may transmit payment information to the server (not illustrated), thereby performing the payment on the product to be purchased in the vendor having the product to be purchased.

For another example, when the mobile terminal 100 is positioned in the vendor having the product to be purchased, the controller 180 may display a UI through which the payment is performed.

Specifically, the storage unit 140 may store location information of a vendor having a product to be purchased. Meanwhile, when the current location of the mobile terminal 100 corresponds to the location information on the vendor having a product which is stored in the storage unit and is to be purchased, the controller 180 may display a UI for performing payment.

More specifically, when the current location of the mobile terminal 100 corresponds to the location information of the vendor having a product which is stored in the storage unit and is to be purchased, and when an input for performing payment is received in the state that the execution screen 1710 of the messenger application is displayed as illustrated in FIG. 22, the controller 180 may display a UI 2310 for performing payment as illustrated in FIG. 23. The controller 180 may transmit information on payment for the product to be purchased, based on the user handling based on the UI 2310 for payment.

Meanwhile, according to another embodiment, when the current location of the mobile terminal 100 corresponds to the location information of the vendor having a product which is stored in the storage unit and is to be purchased, the controller 180 may display an icon (not illustrated) for performing a payment application. In this case, a method may be realized to allow the controller 180 to display a UI 2310 to perform payment if an input of selecting the icon (not illustrated) for performing the payment application is received.

As described above, the present invention provides an environment that a user of a mobile terminal may easily perform payment for a product which another person wants to purchase.

In addition, even if payment is in process off line, a chat window may be displayed, a card image is displayed in the state that the chat window is displayed, and then the payment is immediately made. A user who has made an order with the clerk while viewing a chat window may immediately make payment through simple operation without operation for executing the payment application again.

Figure 24:
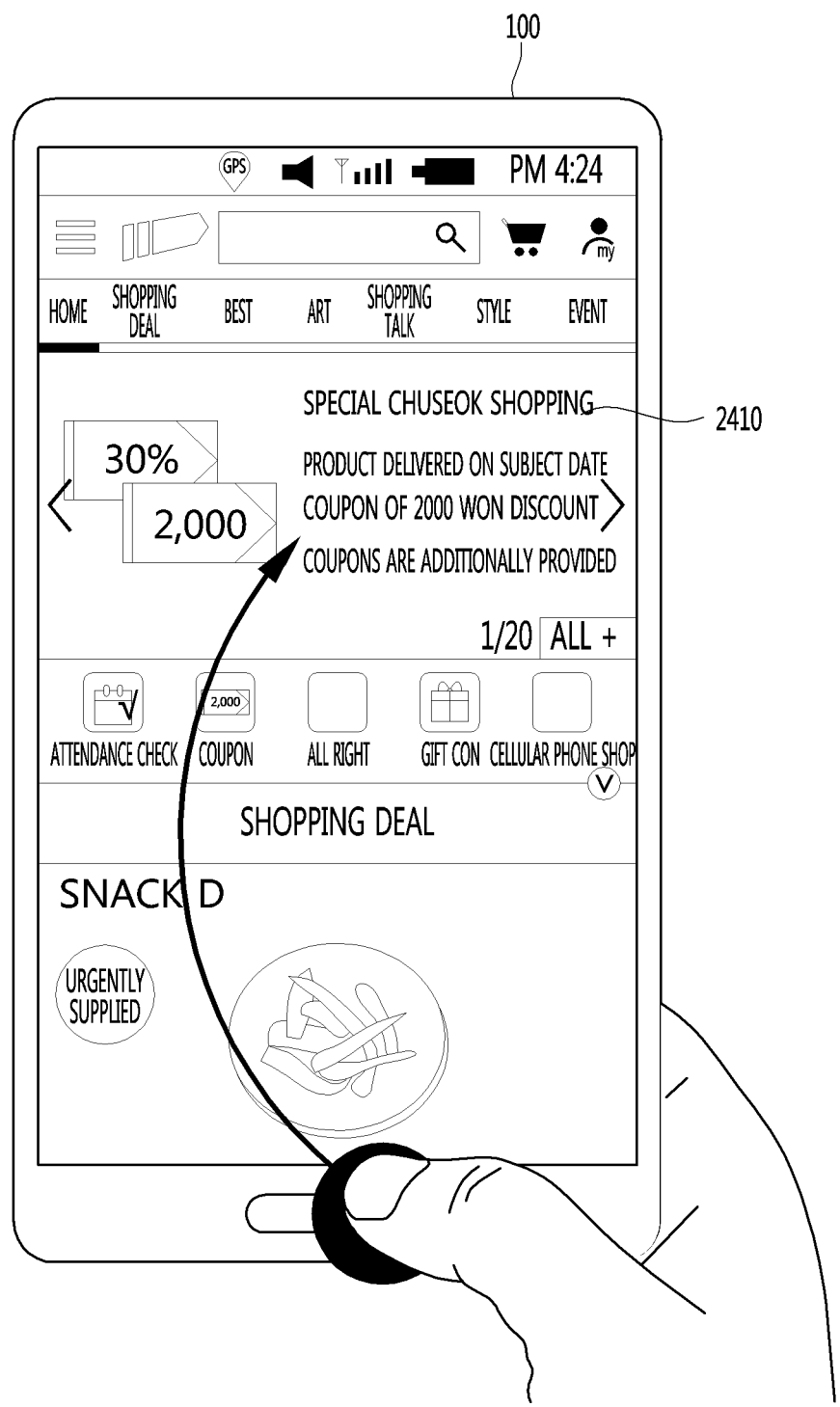
FIGS. 24 to 26 are views illustrating a method for operating a mobile terminal, according to still another embodiment of the present invention.
Figure 25:
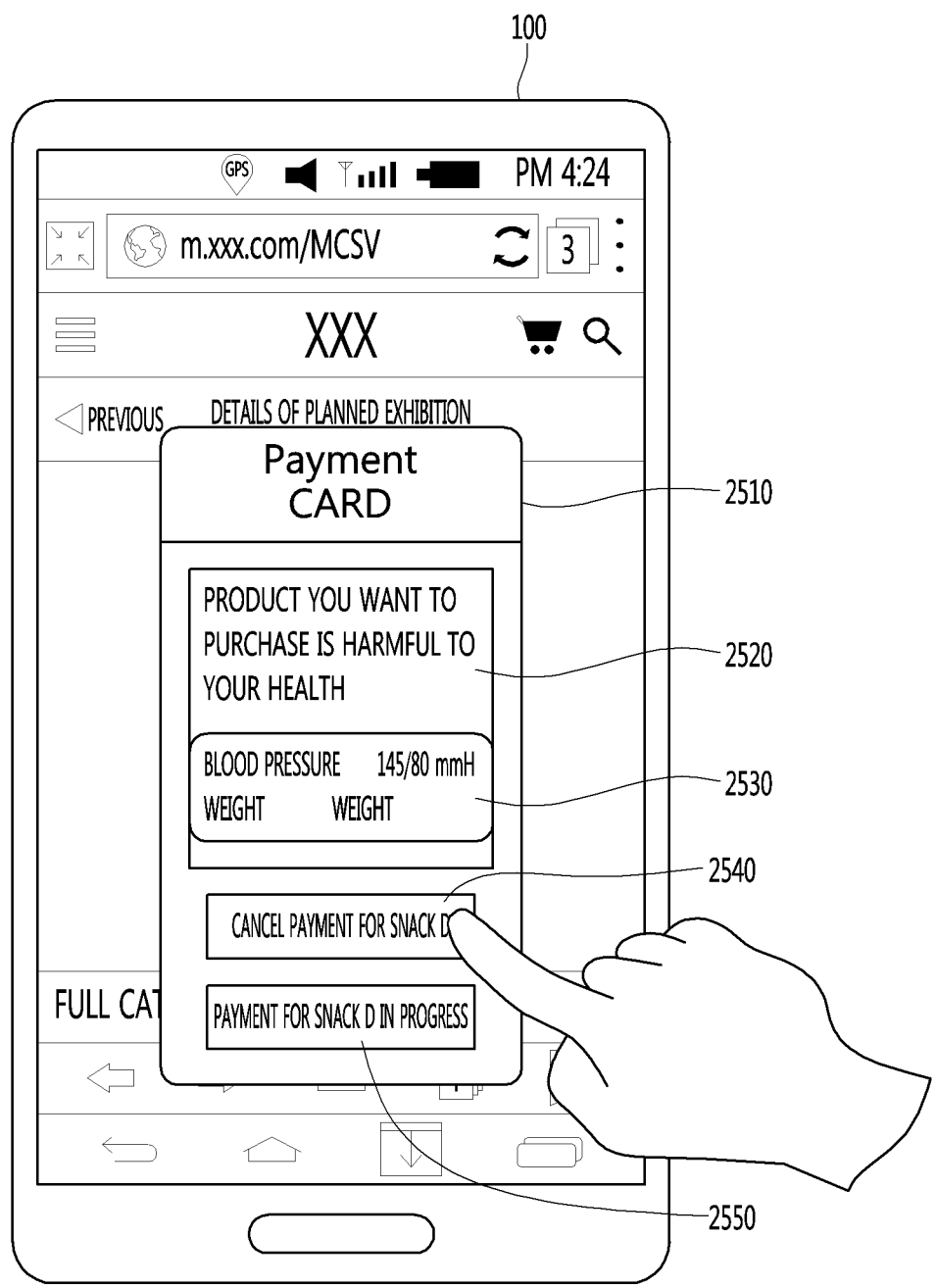
Figure 26:
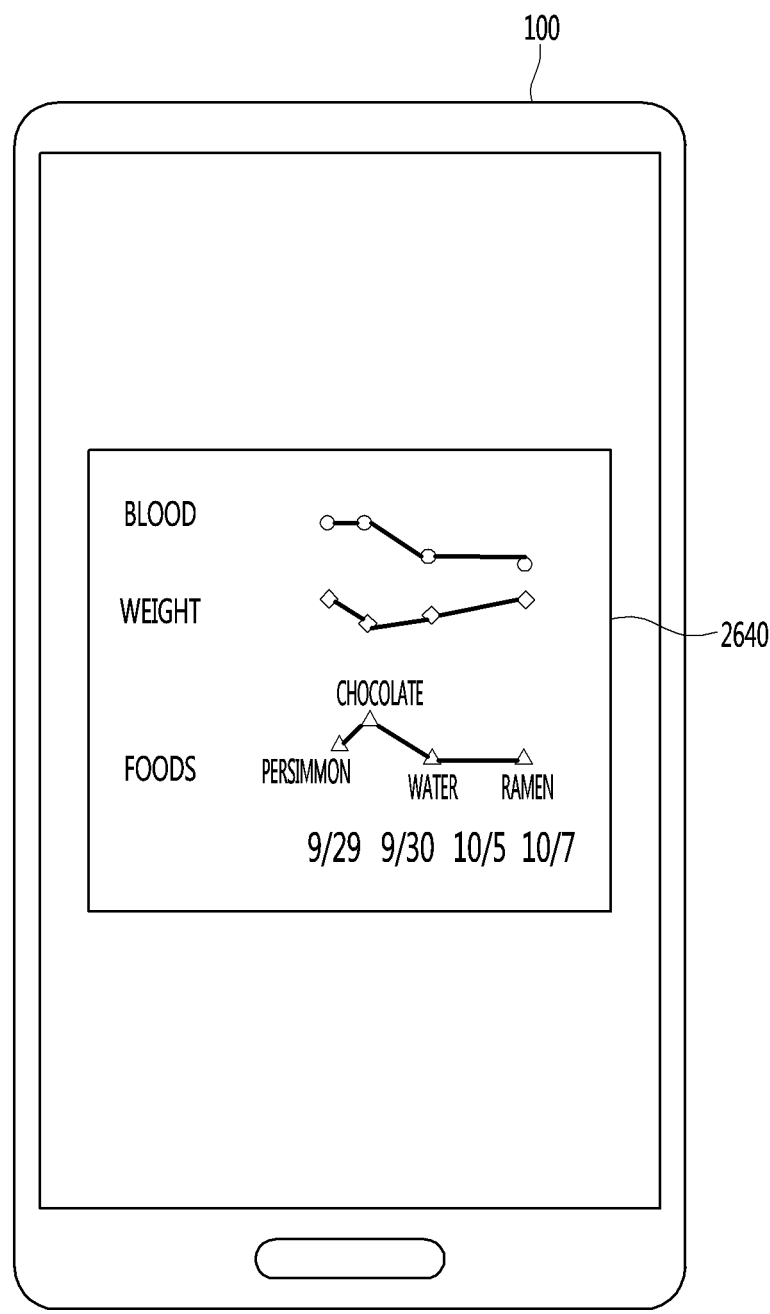

FIGS. 24 to 26 are views illustrating a method for operating a mobile terminal, according to still another embodiment.

The controller 180 may store information on health of a user of the mobile terminal 100. In this case, the information on the health of the user of the mobile terminal 100 may include at least one of Blood pressure, a weight, and blood sugar of the user.

If the payment application is executed in the state that a web-page for purchasing a specific product is displayed, the controller 180 may display a warning message against purchasing the specific product based on at least one of information on the specific product and the information on the health of the user.

In detail, if receiving an input for executing a payment application on a web-page 2410 for purchasing a specific product as illustrated in FIG. 24, the controller 180 may execute a payment application and may display a card image 2510 as illustrated in FIG. 25.

Meanwhile, the card image 2510 may include a warning message 2520 against purchasing a specific product.

In detail, the information on the calorie value and the sugar may be stored in the storage unit 140.

In addition, if the specific product has a high calorie value or a high sugar content so it is possible to damage the user of the mobile terminal 100, the controller 180 may display a warning message 2520 against purchasing of the specific product.

For another example, when the calorie of the specific product is high and the weight of the user of the mobile terminal 100 is recently increased, the controller 180 may display the warning message 2520 against purchasing the specific product.

For another example, if the specific product has the high sugar content, and if the blood sugar level of the user of the mobile terminal 100 is increased, the controller 180 may display the warning message 2520 against purchasing the specific product.

Meanwhile, the controller 180 may display a UI 2540 for canceling payment for a specific product and a UI 2550 allowing the payment for the specific product to continuously proceed. In this case, if an input of selecting the UI 2540 for cancelling the payment for the specific product is received, the payment application may be terminated. Meanwhile, if an input of selecting the UI 2550 allowing the payment for the specific product to continuously proceed is received, the payment procedure may be continuously performed.

Meanwhile, the card image 2510 may include information 2530 on the health of a user. In addition, if an input of selecting the information 2530 on the health of the user is received, the controller may display detailed information 2640 on the health of the user as illustrated in FIG. 26.

Meanwhile, the detailed information 2640 of the user may include information on the variation in various numeric values, such as the blood pressure, the weight, or the blood sugar level of the user, related to the health of the user. In addition, regarding the detailed information 2640 on the health of the user, purchase inputs for products, which may harm a user's health, for example, products having the high sugar content or the high calorie may be displayed.

As described above, the present invention may provide an environment that a user may easily determine information on a product and information on the health of the user in the procedure of making payment, without separately finding information on the product and the information on the health of the user. For example, if the user executes the payment application, the controller may output a warning message against purchasing a product. In this state, the user may immediately make payment through user authentication.

Figure 27:
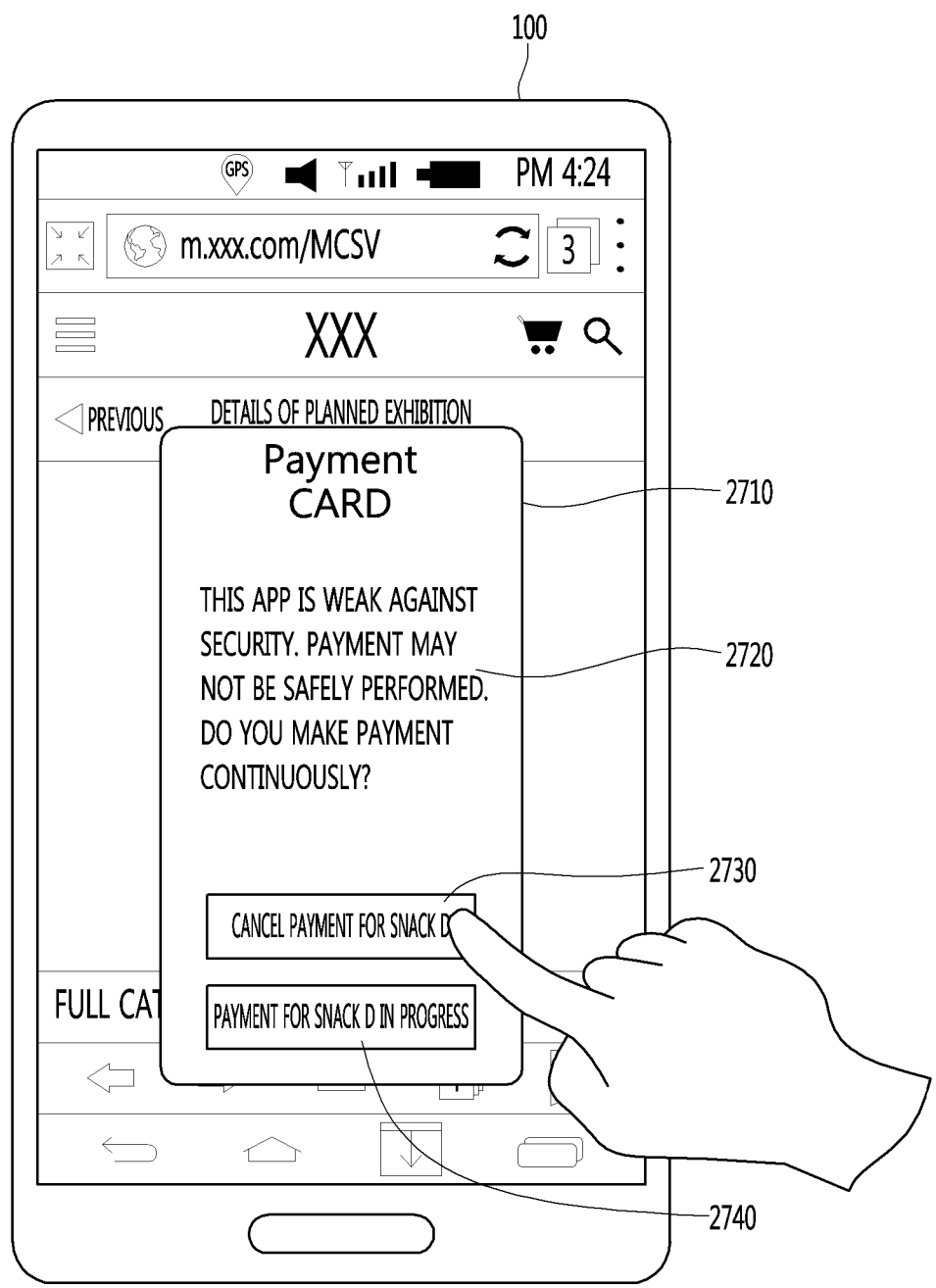
FIGS. 27 to 29 are views illustrating various piece of information to be displayed when the payment application is performed, according to an embodiment of the present invention.
Figure 28:
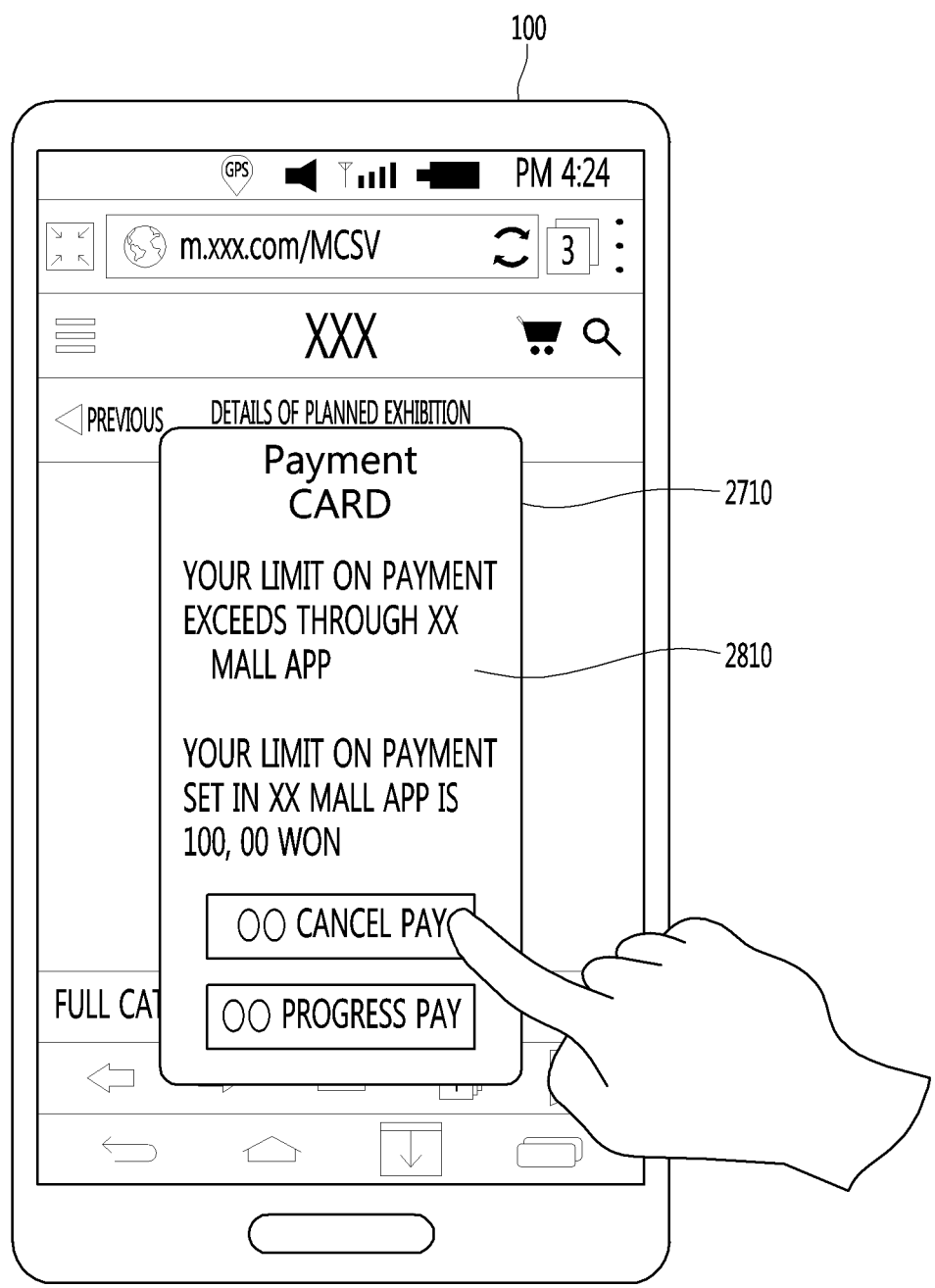
Figure 29:
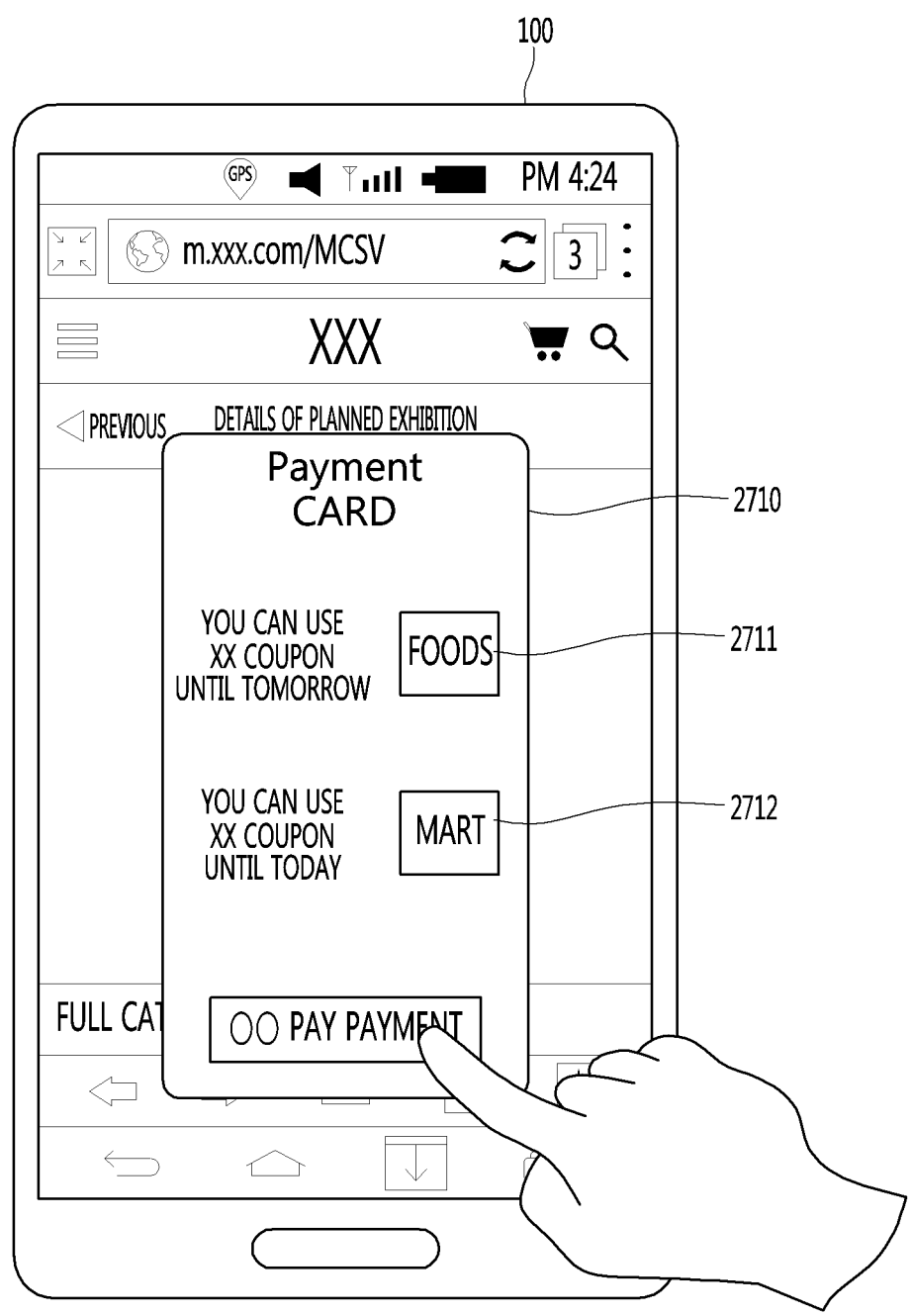

FIGS. 27 to 29 are views illustrating various pieces of information that may be displayed when the payment application is performed, according to the embodiment of the present invention.

Referring to FIG. 27, if the payment application is executed, a card image 2710 displayed may show information related to a security state of a web-page.

In addition, when there is a case weak in security in the procedure of making payment to purchase a product, the controller 180 may display information 2720 representing the weakness in security. In addition, the controller 180 may display a UI 2730 allowing a user to cancel payment for a specific product and a UI 2740 allowing the user to continuously make payment for the product.

Regarding FIG. 28, when the payment application is executed, the card image 2710, which is displayed, may contain information 2810 showing that a limit on payment on a web-page of a specific vendor is exceeded.

In detail, the limit on payment for each vendor may be set depending on a user input. The controller 180 may display the information 2810 showing that the limit on the payment on the web-page of the specific vendor is exceeded if a payment amount allowed to a user in relation to the specific vendor exceeds the limit on the payment set for the specific vendor.

As described above, the present invention may provide an environment that the user may easily recognize various pieces information related to the purchase of a product in the procedure of making payment.

In addition, according to the present invention, the limit on the payment set for the specific vendor is displayed, thereby preventing a user from excessively wasting money and preventing the purchase of the user from being concentrated on the specific vendor.

Referring to FIG. 29, the controller 180 may display an icon allowing a user to link to a web-page or an application employing a coupon discount for a product to be purchased by the user, based on information on a coupon to be applied to the product to be purchased by the user.

In detail, if the payment application is executed, the controller 180 may search for another application or another web-page for acquiring information on a product to be purchased by the user and selling the product to be purchased by the user.

In this case, another application or another web-page for selling the product to be purchased by the user may include an application or a web-page for selling a product the same as or similar to a product to be purchased by the user. For example, when mineral water to be purchased by the user is mineral water produced by vendor "a", the controller 180 may search for another application or another web-page for selling mineral water produced by vendor "b".

Meanwhile, if another application or another web-page has information on a coupon applicable to the product to be purchased by the user, the controller 180 may display at least one of information on the applicable coupon and icons 2711 and 2712 which may link to another application or another web-page.

According to another embodiment, if the payment application is executed, the displayed card image 2710 may include an icon allowing a user to link to a web-page on which the user may purchase a desired produce at the more economical price.

In detail, if the payment application is executed, the controller 180 may search for another application or another web-page for acquiring information on a product to be purchased by a user and for selling the product to be purchased by the user.

In addition, when the same product is sold on another application or another web-page, the controller may display an icon allowing a user to link to a web-page on which the user may purchase a desired product at the more economical product.

The present invention mentioned in the foregoing description may be implemented using a recording medium having a program and codes that are able to read by a computer. A computer-readable medium includes all types of recording devices which is able to be read by a computer system and stores data. Examples of the computer-readable mediums include HDD (Hard Disk Drive), SSD (Solid State Disk), SDD (Silicon Disk Drive), ROM, RAM, CD-ROM, a magnetic tape, a floppy disk, an optical data storage device. The medium includes a medium implemented in the form of a carrier wave (for example, a transmission over the Internet). The medium may include the controller 180 of the mobile terminal. This description is intended to be illustrative without being limitedly interpreted. The scope of the present invention is determined by a reasonable interpretation. All modifications of equivalents of the present invention fall into the scope of the present invention.

The invention claimed is:

1. A method of operating a mobile terminal, the method comprising:
    displaying an image on a display device of the mobile terminal;
    executing a payment application;
    choosing one or more payments performed by the mobile terminal from among total payment details performed by the mobile terminal, based on the image displayed on the display device, when the payment application is executed over the displayed image;
    displaying information on histories of the chosen one or more payments performed by the mobile terminal;
    receiving a first input of selecting a specific payment detail among the displayed information on the histories of the chosen one or more payments performed by the mobile terminal; and
    displaying a first web-page for purchasing a product corresponding to a specific payment detail in accordance with the received first input,
    wherein the choosing of one or more payments performed by the mobile terminal further includes:
    a) displaying a second web-page different than the first web-page on the display device and choosing one or more previous payments made on the second web-page when the payment application is executed while the second web-page is displayed;
    b) displaying a messenger application screen on the display device and choosing one or more previous payments made by a vendor linked to a vendor keyword included in the messenger application screen, when the payment application is executed while the messenger application screen is displayed; and
    c) displaying a background screen on the display device and choosing all of the total payment details when the payment application is executed while the background screen is displayed, and
    wherein the method further comprises:
    acquiring first information on at least one target product to be purchased and second information on a target vendor having the at least one target product based on texts included in a chat window of the messenger application, when the payment application is executed in a state that the image of the execution screen of the messenger application is displayed; and
    displaying a third web-page for purchasing the at least one target product based on the first information and the second information.

2. The method of claim 1, wherein the displaying of the information on the histories of the chosen one or more payments performed by the mobile terminal includes:
    displaying a card image when the payment application is executed;
    receiving an input of selecting the card image; and
    displaying the information on the histories of the chosen one or more payments performed by the mobile terminal on the card image, in accordance with the input of selecting the card image being received.

3. The method of claim 1, wherein the displaying of the information on the histories of the one or more payments performed by the mobile terminal includes:
    displaying the information on the histories of the chosen one or more payments made by the vendor corresponding to the keyword on the execution screen of the messenger application, according to reception of an input of touching and dragging information on a specific payment detail among the information on the histories of the chosen one or more payments made by the vendor corresponding to the keyword, on the execution screen of the messenger application.

4. The method of claim 1, further comprising:
    storing information on health of a user of the mobile terminal, wherein the displaying the information on the histories of the chosen one or more payments performed by the mobile terminal includes:

displaying a warning message against purchasing a specific product, based on at least one of information on the specific product and the information on the health of the user, when the payment application is executed in a state that the image of a fourth web-page for purchasing the specific product is displayed.

5. A mobile terminal comprising:

a display device configured to display an image; and a controller configured to:

execute a payment application, choose one or more payments performed by the mobile terminal from among total payment details performed by the mobile terminal, based on the image displayed on the display device when the payment application is executed over the displayed image, display information on histories of the chosen one or more payments performed by the mobile terminal, receive a first input of selecting a specific payment detail among the displayed information on the histories of the chosen one or more payments performed by the mobile terminal, and display a first web-page for purchasing a product corresponding to a specific payment detail in accordance with the received first input, wherein the controller is further configured to:

a) display a second web-page different than the first web-page on the display device and choose one or more previous payments made on the second web-page when the payment application is executed while the second web-page is displayed, b) display a messenger application screen on the display device and choose one or more previous payments made by a vendor linked to a vendor keyword included in the messenger application screen, when the payment application is executed while the messenger application screen is displayed, and c) display a background screen on the display device and choose all of the total payment details when the payment application is executed while the background screen is displayed, and wherein the controller is further configured to:

acquire first information on at least one target product to be purchased and second information on a target vendor having the at least one target product based on texts included in a chat window of the messenger application, when the payment application is executed in a state that the image of the execution screen of the messenger application is displayed, and display a third web-page for purchasing the at least one target product based on the first information and the second information.

6. The mobile terminal of claim 5, further comprising:

an input device configured to receive an input, wherein the controller is further configured to:

display a card image when the payment application is executed, receive, through the input device, an input of selecting the card image, and display the information on the histories of the chosen one or more payments performed by the mobile terminal on the card image, in accordance with the input of selecting the card image being received.

7. The mobile terminal of claim 5, further comprising: an input device configured to receive an input, wherein the controller is further configured to display the information on the histories of chosen one or more payments made by the vendor corresponding to the keyword on the execution screen of the messenger application, according to reception of an input of touching and dragging information on a specific payment detail, among the information on the histories of the chosen one or more payments made by the vendor corresponding to the keyword, on the execution screen of the messenger application.

8. The mobile terminal of claim 5, further comprising: a memory configured to store information wherein the controller is further configured to:

store information on health of a user of a mobile terminal in the memory, and display a warning message against purchasing a specific product, based on at least one of information on the specific product and the information on the health of the user, when the payment application is executed in a state that the image of a fourth web-page for purchasing the specific product is displayed.

* * * * *